(12) United States Patent
Maeda et al.

(10) Patent No.: US 10,029,588 B2
(45) Date of Patent: Jul. 24, 2018

(54) SEAT RECLINING APPARATUS

(71) Applicant: SHIROKI CORPORATION, Fujisawa-shi, Kanagawa (JP)

(72) Inventors: Noriaki Maeda, Fujisawa (JP); Hidehiko Fujioka, Fujisawa (JP)

(73) Assignee: SHIROKI CORPORATION, Fujisawa-Shi, Kanagawa (JP)

( * ) Notice: Subject to any disclaimer, the term of this patent is extended or adjusted under 35 U.S.C. 154(b) by 23 days.

(21) Appl. No.: 15/441,770

(22) Filed: Feb. 24, 2017

(65) Prior Publication Data

US 2017/0253151 A1   Sep. 7, 2017

(30) Foreign Application Priority Data

Mar. 4, 2016   (JP) .................. 2016-041902

(51) Int. Cl.
   *B60N 2/20*      (2006.01)
   *B60N 2/235*     (2006.01)
   *B60N 2/22*      (2006.01)

(52) U.S. Cl.
   CPC ............ *B60N 2/2356* (2013.01); *B60N 2/20* (2013.01); *B60N 2/224* (2013.01); *B60N 2/2245* (2013.01)

(58) Field of Classification Search
   CPC .. B60N 2/2356; B60N 2/2352; B60N 2/2358; B60N 2/20
   USPC ................................ 297/367 P, 367 R, 367 L
   See application file for complete search history.

(56) References Cited

U.S. PATENT DOCUMENTS

| 2,941,583 | A | * | 6/1960 | Tischler | B60N 2/236 188/82.1 |
| 3,557,633 | A | * | 1/1971 | Frerichs | F16H 55/12 29/893.32 |
| 3,731,342 | A | * | 5/1973 | Cousin | B60N 2/2218 16/329 |
| 3,807,797 | A | * | 4/1974 | Klingelhofer | B60N 2/2227 297/362 |
| 3,879,802 | A | * | 4/1975 | Werner | B60N 2/236 16/325 |
| 3,958,828 | A | * | 5/1976 | Ishida | B60N 2/2218 297/361.1 |

(Continued)

FOREIGN PATENT DOCUMENTS

JP   2003-070583 A   3/2003

*Primary Examiner* — Shin H Kim
(74) *Attorney, Agent, or Firm* — Buchanan Ingersoll & Rooney PC

(57) ABSTRACT

A seat reclining apparatus includes a base member and a ratchet on a seat cushion and a seatback, respectively or vice versa; a lock member which engages with and disengages from a meshing portion of the ratchet; a lock driver which moves the lock member between the engaged position and the disengaged position; and a meshed-state retainer including an engaging portion provided on the base member, and an engaged portion provided on the lock member. When the lock member in the engaged position moves in a direction different from a direction in which the lock member is guided by the guide portion of the base member, the meshed-state retainer moves the lock member toward the engaged position via engagement of the engaged portion with the engaging portion to retain a meshed state between the lock member and the meshing portion of the ratchet.

6 Claims, 25 Drawing Sheets

(56) References Cited

U.S. PATENT DOCUMENTS

| | | | | |
|---|---|---|---|---|
| 4,076,309 A | * | 2/1978 | Chekirda | B60N 2/2358 297/363 |
| 4,082,352 A | * | 4/1978 | Bales | B60N 2/2358 16/325 |
| 4,087,885 A | * | 5/1978 | Gillentine | B60N 2/236 16/325 |
| 4,103,970 A | * | 8/1978 | Homier | B60N 2/2358 297/363 |
| 4,143,905 A | * | 3/1979 | Hensel | B60N 2/433 280/650 |
| 4,211,451 A | * | 7/1980 | Shephard | B60N 2/2251 16/344 |
| 4,348,050 A | * | 9/1982 | Letournoux | B60N 2/2356 16/325 |
| 4,457,556 A | * | 7/1984 | Klingelhofer | B60N 2/2252 297/362 |
| 4,457,557 A | * | 7/1984 | Une | B60N 2/2252 297/362 |
| 4,634,181 A | * | 1/1987 | Pipon | B60N 2/2252 16/347 |
| 4,770,464 A | * | 9/1988 | Pipon | B60N 2/236 297/367 R |
| 4,813,853 A | * | 3/1989 | Otto | F04C 2/084 417/295 |
| 4,836,606 A | * | 6/1989 | Werner | B60N 2/2252 297/362 |
| 4,854,191 A | * | 8/1989 | Nagano | B62M 11/145 475/277 |
| 4,997,223 A | * | 3/1991 | Croft | B60N 2/2358 297/367 R |
| 5,161,856 A | * | 11/1992 | Nishino | B60N 2/2358 297/363 |
| 5,216,936 A | * | 6/1993 | Baloche | B60N 2/2227 297/363 |
| 5,267,918 A | * | 12/1993 | Shiroyama | F02N 15/046 475/331 |
| 5,451,096 A | * | 9/1995 | Droulon | B60N 2/2251 297/362 |
| 5,462,498 A | * | 10/1995 | Lindblad | B60N 2/0232 297/362 |
| 5,531,504 A | * | 7/1996 | Schmale | B60N 2/225 297/354.12 |
| 5,590,931 A | * | 1/1997 | Fourrey | B60N 2/2358 297/366 |
| 5,611,599 A | * | 3/1997 | Baloche | B60N 2/2252 297/367 R |
| 5,622,407 A | * | 4/1997 | Yamada | B60N 2/236 297/366 |
| 5,681,086 A | * | 10/1997 | Baloche | B60N 2/236 297/354.12 |
| 5,685,611 A | * | 11/1997 | Eguchi | B60N 2/236 297/365 |
| 5,692,589 A | * | 12/1997 | Beguin | B60N 2/1615 192/39 |
| 5,718,481 A | * | 2/1998 | Robinson | B60N 2/2354 297/367 R |
| 5,718,483 A | * | 2/1998 | Yamaguchi | B60N 2/236 16/325 |
| 5,749,624 A | * | 5/1998 | Yoshida | B60N 2/236 297/216.13 |
| 5,755,491 A | * | 5/1998 | Baloche | B60N 2/2252 297/362 |
| 5,762,400 A | * | 6/1998 | Okazaki | B60N 2/236 297/367 R |
| 5,769,494 A | * | 6/1998 | Barrere | B60N 2/2358 297/367 R |
| 5,779,313 A | * | 7/1998 | Rohee | B60N 2/2358 297/366 |
| 5,785,386 A | * | 7/1998 | Yoshida | B60N 2/236 297/367 R |
| 5,788,325 A | * | 8/1998 | Ganot | B60N 2/2356 297/216.14 |
| 5,816,656 A | * | 10/1998 | Hoshihara | B60N 2/236 297/367 R |
| 5,820,219 A | * | 10/1998 | Rohee | B60N 2/236 297/367 R |
| 5,871,414 A | * | 2/1999 | Voss | B60N 2/2252 475/162 |
| 5,873,630 A | * | 2/1999 | Yoshida | B60N 2/236 297/216.13 |
| 5,881,854 A | * | 3/1999 | Rougnon-Glasson | B60N 2/162 192/15 |
| 5,884,972 A | * | 3/1999 | Deptolla | B60N 2/433 297/216.14 |
| 5,984,413 A | * | 11/1999 | Baloche | B60N 2/2358 297/367 R |
| 6,007,152 A | * | 12/1999 | Kojima | B60N 2/236 297/367 R |
| 6,007,153 A | * | 12/1999 | Benoit | B60N 2/2358 297/363 |
| 6,010,191 A | * | 1/2000 | Calinaud | B60N 2/2358 297/365 |
| 6,023,994 A | * | 2/2000 | Yoshida | B60N 2/2358 297/367 R |
| 6,024,410 A | * | 2/2000 | Yoshida | B60N 2/2358 297/301.1 |
| 6,039,400 A | * | 3/2000 | Yoshida | B60N 2/2356 297/367 R |
| 6,082,821 A | * | 7/2000 | Baloche | B60N 2/2358 297/354.12 |
| 6,085,386 A | * | 7/2000 | Blanchard | B60N 2/2358 16/325 |
| 6,092,874 A | * | 7/2000 | Kojima | B60N 2/236 297/366 |
| 6,095,608 A | * | 8/2000 | Ganot | B60N 2/2358 297/367 R |
| 6,102,480 A | * | 8/2000 | Asano | B60N 2/236 297/366 |
| 6,112,370 A | * | 9/2000 | Blanchard | B60N 2/2358 16/325 |
| 6,120,098 A | * | 9/2000 | Magyar | B60N 2/20 297/344.11 |
| 6,142,569 A | * | 11/2000 | Kidokoro | B60N 2/236 297/366 |
| 6,149,235 A | * | 11/2000 | Fahim | B60N 2/2362 297/259.2 |
| 6,164,723 A | * | 12/2000 | Ganot | B60N 2/2358 297/367 R |
| 6,224,157 B1 | * | 5/2001 | Di Luccio | B60N 2/2251 192/15 |
| 6,253,894 B1 | * | 7/2001 | Schumann | F16H 31/002 192/15 |
| 6,296,311 B1 | * | 10/2001 | Bonk | B60N 2/2227 297/367 R |
| 6,312,053 B1 | * | 11/2001 | Magyar | B60N 2/20 297/367 R |
| 6,325,457 B1 | * | 12/2001 | Matsumoto | B60N 2/181 297/366 |
| 6,325,458 B1 | * | 12/2001 | Rohee | B60N 2/235 297/367 R |
| 6,328,382 B1 | * | 12/2001 | Yamashita | B60N 2/236 297/367 R |
| 6,332,649 B1 | * | 12/2001 | Vossmann | B60N 2/236 297/366 |
| 6,364,413 B1 | * | 4/2002 | Rohee | B60N 2/236 297/367 R |
| 6,390,557 B1 | * | 5/2002 | Asano | B60N 2/236 297/367 R |
| 6,402,249 B1 | * | 6/2002 | Rohee | B60N 2/20 297/367 R |
| 6,439,663 B1 | * | 8/2002 | Ikegaya | B60N 2/236 297/366 |
| 6,454,354 B1 | * | 9/2002 | Vossmann | B60N 2/2356 297/367 R |
| 6,464,298 B1 | * | 10/2002 | Hansel | B60N 2/0705 297/366 |
| 6,474,734 B1 | * | 11/2002 | Masuda | B60N 2/4214 297/216.13 |

(56) References Cited

U.S. PATENT DOCUMENTS

| | | | | |
|---|---|---|---|---|
| 6,474,740 B1 * | 11/2002 | Kondo | B60N 2/236 297/367 R |
| 6,520,583 B1 * | 2/2003 | Bonk | B60N 2/236 192/223.1 |
| 6,554,361 B2 * | 4/2003 | Reubeuze | B60N 2/2358 297/367 R |
| 6,561,585 B2 * | 5/2003 | Cilliere | B60N 2/236 297/367 R |
| 6,568,759 B1 * | 5/2003 | Hochmuth | B60N 2/2227 297/367 R |
| 6,575,278 B1 * | 6/2003 | Schumann | B60N 2/2352 192/19 |
| 6,609,758 B1 * | 8/2003 | Lefevere | B60N 2/763 297/411.38 |
| 6,626,495 B2 * | 9/2003 | Okazaki | B60N 2/2356 297/367 R |
| 6,629,733 B2 * | 10/2003 | Matsuura | B60N 2/2362 297/216.1 |
| 6,634,713 B2 * | 10/2003 | Nonomiya | B60N 2/2356 297/367 R |
| 6,640,952 B2 * | 11/2003 | Baloche | B60N 2/167 192/223.2 |
| 6,648,414 B2 * | 11/2003 | Ikegaya | B60N 2/2362 297/367 R |
| 6,666,515 B2 * | 12/2003 | Asano | B60N 2/2362 297/366 |
| 6,669,296 B2 * | 12/2003 | Moriyama | B60N 2/236 297/363 |
| 6,669,297 B2 * | 12/2003 | Cilliere | B60N 2/236 297/366 |
| 6,675,945 B2 * | 1/2004 | Kim | B60N 2/167 192/223 |
| 6,676,217 B2 * | 1/2004 | Lange | B60N 2/236 297/367 R |
| 6,695,405 B2 * | 2/2004 | Senseby | B60N 2/2358 297/378.1 |
| 6,715,835 B2 * | 4/2004 | Hoshihara | B60N 2/236 297/366 |
| 6,726,281 B2 * | 4/2004 | Baloche | B60N 2/2358 297/367 R |
| 6,742,844 B2 * | 6/2004 | Pollack | B60N 2/2356 297/366 |
| 6,749,263 B2 * | 6/2004 | Peters | B60N 2/236 297/367 R |
| 6,755,471 B2 * | 6/2004 | Hoshihara | B60N 2/2362 297/366 |
| 6,758,524 B2 * | 7/2004 | Kisiel | B60N 2/2218 297/362 |
| 6,769,740 B2 * | 8/2004 | Yamada | B60N 2/236 297/366 |
| 6,820,937 B1 * | 11/2004 | Esaki | B60N 2/236 297/366 |
| 6,830,298 B2 * | 12/2004 | Koczewski | B60N 2/224 297/362 |
| 6,843,533 B1 * | 1/2005 | Miyata | B60N 2/236 297/367 R |
| 6,854,802 B2 * | 2/2005 | Matsuura | B60N 2/236 297/367 R |
| 6,880,887 B2 * | 4/2005 | Hoshihara | B60N 2/236 297/367 R |
| 6,908,156 B1 * | 6/2005 | Park | B60N 2/2362 297/366 |
| 6,910,737 B2 * | 6/2005 | Hosokawa | B60N 2/236 297/362 |
| 6,918,635 B2 * | 7/2005 | Finner | B60N 2/2252 297/362 |
| 6,923,504 B1 * | 8/2005 | Liu | B60N 2/236 297/367 R |
| 6,991,294 B2 * | 1/2006 | Choi | B60N 2/2362 297/365 |
| 6,991,295 B2 * | 1/2006 | Peters | B60N 2/2356 297/367 R |
| 7,021,714 B2 * | 4/2006 | Oki | B60N 2/236 297/366 |
| 7,021,715 B2 * | 4/2006 | Umezaki | B60N 2/236 297/366 |
| 7,090,299 B2 * | 8/2006 | Lange | B60N 2/2252 297/362 |
| 7,097,251 B2 * | 8/2006 | Uramichi | B60N 2/236 297/366 |
| 7,097,253 B2 * | 8/2006 | Coughlin | B60N 2/206 297/367 R |
| 7,100,986 B2 * | 9/2006 | Uramichi | B60N 2/236 297/366 |
| 7,100,987 B2 * | 9/2006 | Volker | B60N 2/236 297/367 R |
| 7,114,778 B2 * | 10/2006 | Schuler | B60N 2/1615 297/367 R |
| 7,140,686 B2 * | 11/2006 | Rohee | B60N 2/2356 297/366 |
| 7,144,082 B2 * | 12/2006 | Ohba | B60N 2/2362 297/367 R |
| 7,150,503 B2 * | 12/2006 | Ohba | B60N 2/2362 297/367 R |
| 7,159,945 B2 * | 1/2007 | Eppert | B60N 2/2354 297/367 R |
| 7,165,813 B2 * | 1/2007 | Tame | B60N 2/236 297/367 R |
| 7,168,764 B2 * | 1/2007 | Reubeuze | B60N 2/236 297/367 R |
| 7,188,905 B2 * | 3/2007 | Ham | B60N 2/2356 297/367 R |
| 7,195,318 B2 * | 3/2007 | Cha | B60N 2/236 297/366 |
| 7,201,447 B2 * | 4/2007 | Yamada | B60N 2/236 297/216.13 |
| 7,204,555 B2 * | 4/2007 | Thiel | B60N 2/236 297/364 |
| 7,222,916 B2 * | 5/2007 | De Wilde | B60N 2/427 297/216.1 |
| 7,261,379 B2 * | 8/2007 | Volker | B60N 2/236 297/367 R |
| 7,303,499 B2 * | 12/2007 | Klindworth | B60N 2/2252 475/176 |
| 7,341,311 B2 * | 3/2008 | Ohba | B60N 2/2362 297/216.13 |
| 7,354,109 B2 * | 4/2008 | Oki | B60N 2/236 297/367 R |
| 7,360,838 B2 * | 4/2008 | Smuk | B60N 2/236 297/367 R |
| 7,364,237 B2 * | 4/2008 | Grable | B60N 2/20 297/367 R |
| 7,404,604 B2 * | 7/2008 | Nag | B60N 2/236 297/367 R |
| 7,407,230 B1 * | 8/2008 | Luo | B60N 2/236 297/367 R |
| 7,458,639 B2 * | 12/2008 | Thiel | B60N 2/20 297/367 R |
| 7,475,945 B2 * | 1/2009 | Reubeuze | B60N 2/2358 297/367 R |
| 7,478,881 B2 * | 1/2009 | Leconte | B60N 2/235 297/367 R |
| 7,517,021 B2 * | 4/2009 | Wahls | B60N 2/236 297/367 R |
| 7,552,971 B1 * | 6/2009 | Tarusawa | B60N 2/236 297/367 P |
| 7,563,049 B2 * | 7/2009 | Peters | B60N 2/236 297/369 |
| 7,571,963 B2 * | 8/2009 | Peters | B60N 2/236 267/156 |
| 7,578,556 B2 * | 8/2009 | Ohba | B60N 2/20 297/354.12 |
| 7,588,294 B2 * | 9/2009 | Matsumoto | B60N 2/2362 297/366 |
| 7,607,737 B2 * | 10/2009 | Liebich | B60N 2/2254 297/362 |
| 7,614,700 B2 * | 11/2009 | Peters | B60N 2/236 297/367 P |

(56) References Cited

U.S. PATENT DOCUMENTS

| | | | | |
|---|---|---|---|---|
| 7,703,852 B2* | 4/2010 | Wahls | B60N 2/236 | 297/367 R |
| 7,722,121 B2* | 5/2010 | Fujioka | B60N 2/236 | 297/367 L |
| 7,758,124 B2* | 7/2010 | Kojima | B60N 2/236 | 297/367 R |
| 7,775,594 B2* | 8/2010 | Bruck | B60N 2/20 | 297/362 |
| 7,850,243 B2* | 12/2010 | Sakamoto | B60N 2/2227 | 297/362 |
| 8,162,400 B2* | 4/2012 | Mitsuhashi | B60N 2/236 | 297/362 |
| 8,262,165 B2* | 9/2012 | Mitsuhashi | B60N 2/2252 | 297/362 |
| 8,651,578 B2* | 2/2014 | Yamada | B60N 2/236 | 297/367 P |
| 8,960,798 B2* | 2/2015 | Ito | B60N 2/2356 | 297/366 |
| 9,004,601 B2* | 4/2015 | Higashi | A47C 1/024 | 297/367 L |
| 9,902,297 B2* | 2/2018 | Robinson | B60N 2/236 | |
| 2002/0024246 A1* | 2/2002 | Yamada | B60N 2/236 | 297/367 R |
| 2002/0033627 A1* | 3/2002 | Hoshihara | B60N 2/236 | 297/367 R |
| 2002/0041119 A1* | 4/2002 | Kojima | B60N 2/236 | 297/367 R |
| 2002/0043852 A1* | 4/2002 | Uramichi | B60N 2/236 | 297/366 |
| 2002/0043856 A1* | 4/2002 | Ikegaya | B60N 2/236 | 297/367 R |
| 2002/0096922 A1* | 7/2002 | Villaroel | B60N 2/2362 | 297/366 |
| 2002/0096923 A1* | 7/2002 | Uramichi | B60N 2/2356 | 297/366 |
| 2002/0096924 A1* | 7/2002 | Reubeuze | B60N 2/2358 | 297/367 R |
| 2002/0096925 A1* | 7/2002 | Uramichi | B60N 2/2258 | 297/367 R |
| 2002/0171280 A1* | 11/2002 | Okazaki | B60N 2/2356 | 297/367 R |
| 2003/0025376 A1* | 2/2003 | Moriyama | B60N 2/236 | 297/367 R |
| 2003/0067205 A1* | 4/2003 | Eppert | B60N 2/2356 | 297/463.1 |
| 2003/0085603 A1* | 5/2003 | Lee | B60N 2/236 | 297/367 R |
| 2003/0173810 A1* | 9/2003 | Lee | B60N 2/2252 | 297/367 R |
| 2003/0178879 A1* | 9/2003 | Uramichi | B60N 2/2356 | 297/367 R |
| 2003/0214165 A1* | 11/2003 | Finner | B60N 2/2252 | 297/326 |
| 2003/0230923 A1* | 12/2003 | Uramichi | B60N 2/236 | 297/367 R |
| 2004/0036337 A1* | 2/2004 | Hoshihara | B60N 2/236 | 297/367 R |
| 2004/0036338 A1* | 2/2004 | Lardais | B60N 2/236 | 297/367 R |
| 2004/0084945 A1* | 5/2004 | Toba | B60N 2/20 | 297/367 R |
| 2004/0145226 A1* | 7/2004 | Bonk | B60N 2/236 | 297/367 R |
| 2004/0145227 A1* | 7/2004 | Bonk | B60N 2/236 | 297/367 R |
| 2004/0195889 A1* | 10/2004 | Secord | B60N 2/224 | 297/362 |
| 2004/0195890 A1* | 10/2004 | Liu | B60N 2/236 | 297/367 R |
| 2005/0035640 A1* | 2/2005 | Shinozaki | B60N 2/2358 | 297/367 R |
| 2005/0073185 A1* | 4/2005 | Uramichi | B60N 2/236 | 297/366 |
| 2005/0082892 A1* | 4/2005 | Yamada | B60N 2/20 | 297/367 R |
| 2005/0146187 A1* | 7/2005 | Volker | B60N 2/236 | 297/369 |
| 2005/0156454 A1* | 7/2005 | Fast | B60N 2/236 | 297/367 R |
| 2005/0168034 A1* | 8/2005 | Fast | B60N 2/236 | 297/367 R |
| 2005/0231016 A1* | 10/2005 | Kojima | B60N 2/123 | 297/363 |
| 2005/0264076 A1* | 12/2005 | Uramichi | B60N 2/236 | 297/367 R |
| 2005/0275270 A1* | 12/2005 | Lee | B60N 2/2356 | 297/367 R |
| 2006/0012232 A1* | 1/2006 | Coughlin | B60N 2/20 | 297/367 R |
| 2006/0055222 A1* | 3/2006 | Bonk | B60N 2/236 | 297/367 R |
| 2006/0145523 A1* | 7/2006 | Yamada | B60N 2/236 | 297/367 R |
| 2006/0170269 A1* | 8/2006 | Oki | B60N 2/20 | 297/367 R |
| 2006/0261657 A1* | 11/2006 | Luo | B60N 2/236 | 297/367 R |
| 2007/0024099 A1* | 2/2007 | Becker | B60N 2/2252 | 297/366 |
| 2007/0040436 A1* | 2/2007 | Oki | B60N 2/236 | 297/367 R |
| 2007/0040437 A1* | 2/2007 | Nagura | B60N 2/20 | 297/367 R |
| 2007/0057558 A1* | 3/2007 | Kojima | B60N 2/236 | 297/367 R |
| 2007/0096529 A1* | 5/2007 | Kojima | B60N 2/2227 | 297/366 |
| 2007/0102982 A1* | 5/2007 | Yamada | B60N 2/236 | 297/367 R |
| 2007/0108825 A1* | 5/2007 | Yamada | B60N 2/236 | 297/367 R |
| 2007/0132294 A1* | 6/2007 | Yamada | B60N 2/236 | 297/367 R |
| 2007/0138854 A1* | 6/2007 | Paing | B60N 2/20 | 297/378.12 |
| 2007/0145800 A1* | 6/2007 | Thiel | B60N 2/236 | 297/367 R |
| 2007/0145801 A1* | 6/2007 | Yamada | B60N 2/236 | 297/369 |
| 2007/0289092 A1* | 12/2007 | Rohee | B60N 2/236 | 16/221 |
| 2008/0001458 A1* | 1/2008 | Hoshihara | B60N 2/0232 | 297/362 |
| 2008/0048478 A1* | 2/2008 | Koumura | B60N 2/20 | 297/367 R |
| 2008/0073961 A1* | 3/2008 | Wahls | B60N 2/236 | 297/367 R |
| 2008/0093906 A1* | 4/2008 | Gruson | B60N 2/236 | 297/361.1 |
| 2008/0093907 A1* | 4/2008 | Nag | B60N 2/2356 | 297/367 R |
| 2008/0174163 A1* | 7/2008 | Kojima | B60N 2/236 | 297/367 R |
| 2008/0203798 A1* | 8/2008 | Kienke | B60N 2/2362 | 297/367 R |
| 2008/0203799 A1* | 8/2008 | Yamada | B60N 2/2362 | 297/367 R |
| 2008/0211285 A1* | 9/2008 | Ishihara | B60N 2/20 | 297/366 |
| 2008/0231103 A1* | 9/2008 | Rohee | B60N 2/20 | 297/354.1 |
| 2008/0238171 A1* | 10/2008 | Kojima | B60N 2/206 | 297/362 |
| 2008/0303331 A1* | 12/2008 | Heo | B60N 2/2362 | 297/362 |
| 2009/0001797 A1* | 1/2009 | Neumann | B60N 2/123 | 297/378.12 |

(56) References Cited

U.S. PATENT DOCUMENTS

| | | | |
|---|---|---|---|
| 2009/0066138 A1* | 3/2009 | Reubeuze | B60N 2/2358 297/367 R |
| 2009/0085391 A1* | 4/2009 | Peters | B60N 2/236 297/367 R |
| 2009/0200850 A1* | 8/2009 | Heo | B60N 2/2362 297/362 |
| 2009/0236892 A1* | 9/2009 | Cillierre | B60N 2/236 297/366 |
| 2009/0243360 A1* | 10/2009 | Tarusawa | B60N 2/236 297/362 |
| 2009/0243361 A1* | 10/2009 | Tarusawa | B60N 2/236 297/362 |
| 2009/0243363 A1* | 10/2009 | Tarusawa | B60N 2/236 297/367 P |
| 2009/0302658 A1* | 12/2009 | Fassbender | B60N 2/236 297/367 P |
| 2010/0026071 A1* | 2/2010 | Ohba | B60N 2/2362 297/366 |
| 2010/0033004 A1* | 2/2010 | Reubeuze | B60N 2/2362 297/367 P |
| 2010/0109408 A1* | 5/2010 | Ohba | B60N 2/2362 297/367 P |
| 2010/0139425 A1* | 6/2010 | Schulz | B60N 2/1655 74/63 |
| 2010/0194164 A1* | 8/2010 | Cha | B60N 2/2362 297/362 |
| 2010/0194165 A1* | 8/2010 | Iguchi | B60N 2/2362 297/367 P |
| 2012/0277050 A1* | 11/2012 | Jokiel | B60N 2/2252 475/175 |
| 2013/0161994 A1* | 6/2013 | Ito | A47C 1/025 297/367 P |
| 2015/0035337 A1* | 2/2015 | Yamada | B60N 2/236 297/367 P |
| 2015/0306985 A1* | 10/2015 | Kimura | B60N 2/12 297/354.12 |
| 2015/0360589 A1* | 12/2015 | Robinson | B60N 2/236 297/367 P |

* cited by examiner

SEAT RECLINING APPARATUS

BACKGROUND OF THE INVENTION

1. Field of the Invention

The present invention relates to a seat reclining apparatus which is installed in a seatback-angle adjustable reclining seat.

2. Description of the Related Art

A type of reclining apparatus including: a base plate (lower arm) which is fixed to a seat cushion frame; a ratchet plate (upper arm) which is fixed to a seatback frame and provided on the inner periphery thereof with an annular internal gear (toothed portion); and pawls (a plurality of pawls are often provided at different positions in the circumferential direction) which are supported to be movable relative to the base plate in radial directions of the base plate, wherein the reclining seat is brought into a locked state, in which the ratchet plate and the base plate are prevented from rotating relative to each other, by bringing the outer toothed portion which is formed on each pawl into mesh with the annular internal gear of the ratchet plate, is widely known in the art as a seat reclining apparatus provided between a seat cushion frame and a seatback frame of a reclining seat. Each pawl is biased in a direction (locking direction) to bring the outer toothed portion thereof into mesh with the internal gear of the ratchet plate by a biaser such as a spring, and the reclining seat is brought into an unlocked state by moving each pawl in a direction to disengage the pawl from the internal gear of the ratchet using a cam member or the like against the biasing force of the biaser.

In this type of seat reclining apparatus, guide surfaces which slidably support and guide the pawls are formed on the base plate, and the pawls move in radial direction of the base plate along the guide surfaces. Between each pawl and the associated guide surfaces is secured a minimum clearance allowing the pawl to slide on the guide surfaces, so that each pawl is prevented from tilting beyond this clearance by the associated guide surfaces. However, in the case where an excessive load in a rotational direction which exceeds a normally expected range is exerted on the pawls, a tilt or deflection occurs in the pawls and the cam member that supports the pawls, which causes a reduction in the degree of engagement between the outer toothed portion of the pawls and the annular internal gear of the ratchet plate. Accordingly, there is a possibility that a required locking strength will not be able to be maintained.

The seat reclining apparatus disclosed in Japanese Unexamined Patent Publication No. 2003-70583 has a reinforcing structure which restricts the tilting amount of each pawl. This reinforcing structure consists of grooves which are formed on the base plate in addition to the guide surfaces, and protrusions which are formed on the pawls to be inserted into the grooves of the base plate, and the tilting amount of each pawl is restricted by engagement of the protrusion of this pawl with the inner surface of the associated groove.

SUMMARY OF THE INVENTION

In the seat reclining apparatus which is installed in a seatback-angle adjustable reclining seat, it is desirable that engagement between the outer toothed portion of each pawl and the internal gear of the ratchet plate be maintained more securely to improve safety of the seat reclining apparatus when an excessive load is exerted on the pawl. Accordingly, the present invention provides a seat reclining apparatus which is simple in structure and superior in load bearing performance.

According to an aspect of the present invention, a seat reclining apparatus is provided, which enables an angle of a seatback of a reclining seat to be adjusted relative to a seat cushion of the reclining seat, the seat reclining apparatus including a base member provided on one of the seat cushion and the seatback; a ratchet provided on the other of the seat cushion and the seatback and allowed to rotate relative to the base member, the ratchet provided with a meshing portion; a lock member configured to be guided by a guide portion formed on the base member so that the lock member is movable between an engaged position, in which the lock member is engaged with the meshing portion of the ratchet, and a disengaged position, in which the lock member is disengaged from the meshing portion of the ratchet; a lock driver configured to move the lock member between the engaged position and the disengaged position in accordance with rotation of a rotational shaft member; and a meshed-state retainer including an engaging portion provided on the base member independently of the guide portion, and an engaged portion provided on the lock member, wherein, when the lock member in the engaged position moves in a direction different from a direction in which the lock member is guided by the guide portion of the base member, the meshed-state retainer is configured to move the lock member toward the engaged position via engagement of the engaged portion with the engaging portion to retain a meshed state between the lock member and the meshing portion of the ratchet.

It is desirable for the engaging portion of the meshed-state retainer to include a pair of engaging portions provided at different positions with respect to a circumferential direction about a rotation center of the ratchet, and for the engaged portion of the meshed-state retainer to include a pair of engaged portions provided at different positions with respect to the circumferential direction.

Accordingly, the lock member can be made to move toward the engaged position in the same manner for the load in either the forward or reverse rotational direction.

It is desirable for the lock member to include a restriction portion which comes into contact with a contact portion formed on the ratchet, whereby movement of the lock member toward the engaged position is restricted, when the ratchet is positioned at a predetermined position in the circumferential direction relative to the base member. The pair of engaged portions are positioned on either side of the restriction portion with respect to the circumferential direction.

In an aspect of the present invention, the engaging portion includes a depression formed on the base member, and the engaged portion includes a projection which projects from the lock member to be positioned in the depression. In another aspect of the present invention, the engaged portion includes a depression formed on the base member, and the engaging portion includes a projection which projects from the lock member to be positioned in the depression.

It is desirable for the lock driver to include a rotational member having a through-hole into which the rotational shaft member is inserted to be non-rotatable relative to the rotational member.

In the seat reclining apparatus according to the present invention, a seat reclining apparatus which is simple structure and superior in load bearing performance can be obtained since the seat reclining apparatus is equipped with the meshed-state retainer, which moves the lock member toward the engaged position upon a heavy load in a direction different from the sliding direction of the lock member relative to the base member (a heavy load in the circumferential direction) being exerted on the lock member, as the engaging portion and the engaged portion that are provided on the base member and the lock member, respectively.

The present disclosure relates to subject matter contained in Japanese Patent Application No. 2016-41902 (filed on Mar. 4, 2016) which is expressly incorporated herein by reference in its entirety.

BRIEF DESCRIPTION OF DRAWINGS

The present invention will be discussed below in detail with reference to the accompanying drawings, in which.

DESCRIPTION OF THE EMBODIMENTS

The present invention will be hereinafter discussed with reference to the accompanying drawings. The leftward and rightward directions in the following description correspond to the directions shown by the arrows "LEFT" and "RIGHT", respectively, shown in FIGS. 2 and 7. In each embodiment of the seat reclining apparatus according to the present invention which will be discussed later, the term "right side" refers to the vehicle exterior side and the term "left side" refers to the vehicle interior side. In addition, the term "inner peripheral side" refers to the radial center side (radially inner side) of the seat reclining apparatus and the term "outer peripheral side" refers to the radially opposite side of the seat reclining apparatus from the radial center side thereof.

Figure 1:
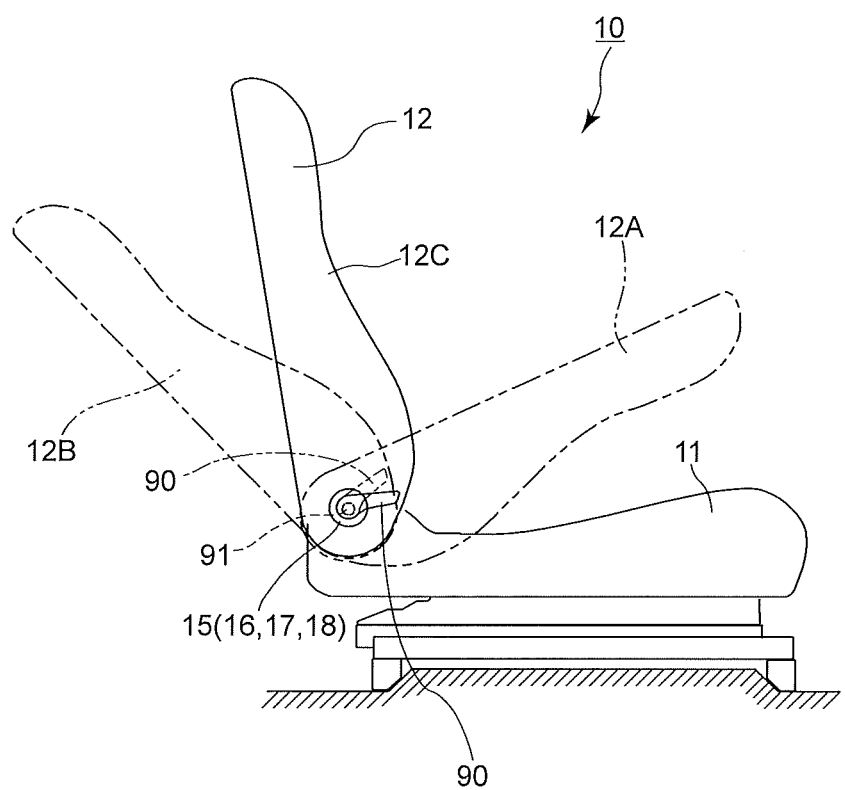
FIG. 1 is a side elevational view of a reclining seat equipped with a seat reclining apparatus according to the present invention.

A reclining seat 10 for vehicle shown in FIG. 1 is a right-side seat (with respect to the direction in which the vehicle moves) and is provided with a seat cushion 11 which is supported by a vehicle interior floor of a vehicle (e.g., an automobile) via a seat rail, and a seatback 12 which is tiltable relative to (pivoted at) the rear of the seat cushion 11. The reclining seat 10 is provided thereinside with a forward-tilting biasing spring (not shown) which rotationally biases the seatback 12 forward with respect to the seat cushion 11.

The vehicle seat 10 is provided inside the seat cushion 11 with a pair of left and right seat cushion frames (not shown). The vehicle seat 10 is provided at the back of the seat cushion 11 with a pair of left and right rear frames (not shown) in a fixed state which project upward. The vehicle seat 10 is provided inside the seatback 12 with a pair of left and right seatback frames (not shown). The pair of left and right seatback frames are positioned between the left and right rear frames, and the left seatback frame and the left rear frame face against each other in the leftward and rightward directions (vehicle widthwise direction) and the right seatback frame and the right rear frame face against each other in the leftward and rightward directions. On the left side (vehicle interior side) of the reclining seat 10, the left rear frame and the left seatback frame are rotatably connected via a rotational connection shaft (not shown). On the other hand, the reclining seat 10 is provided, on the right side (vehicle exterior side) of the reclining seat 10 that can be seen in FIG. 1, with a seat reclining apparatus between the right rear frame and the right seatback frame to thereby connect each other threat in a manner to allow the right rear frame and the right seatback frame to rotate about an axis extending in the leftward and rightward direction. This seat reclining apparatus is shown as first through fourth embodiments of seat reclining apparatuses according to the present invention which will be discussed below and are designated by the reference numerals 15, 16, 17 and 18, respectively. The seatback 12 is rotatable about the aforementioned rotational connection shaft and the seat reclining apparatus 15 (16, 17, 18) relative to the seat cushion 11. Specifically, the seatback 12 is rotatable between a forwardly-tilted position shown by a two-dot chain line designated by 12A in FIG. 1 and a rearward-tilted position shown by a two-dot chain line designated by 12B in FIG. 1. The position of the seatback 12 shown by a solid line designated by 12C is a first-stage (initial-stage) locked position at which the seatback 12 is prevented from tilting by the seat reclining apparatus 15 (16, 17, 18). The section ranging from the first-stage locked position 12C to the forwardly-tilted position 12A is a freely tiltable section in which the seatback 12 is not locked (in which the seat reclining apparatus 15 is in an unlocked-state holding state which will be discussed later), while the section ranging from the first-stage locked position 12C to the rearward-tilted position 12B is a lock operating section in which the seatback 12 can be tilted (i.e., the angle of the seatback 12 can be adjusted relative to the seat cushion 11) only when an unlocking operation is performed on the seat reclining apparatus 15 (16, 17, 18).

Figure 2:
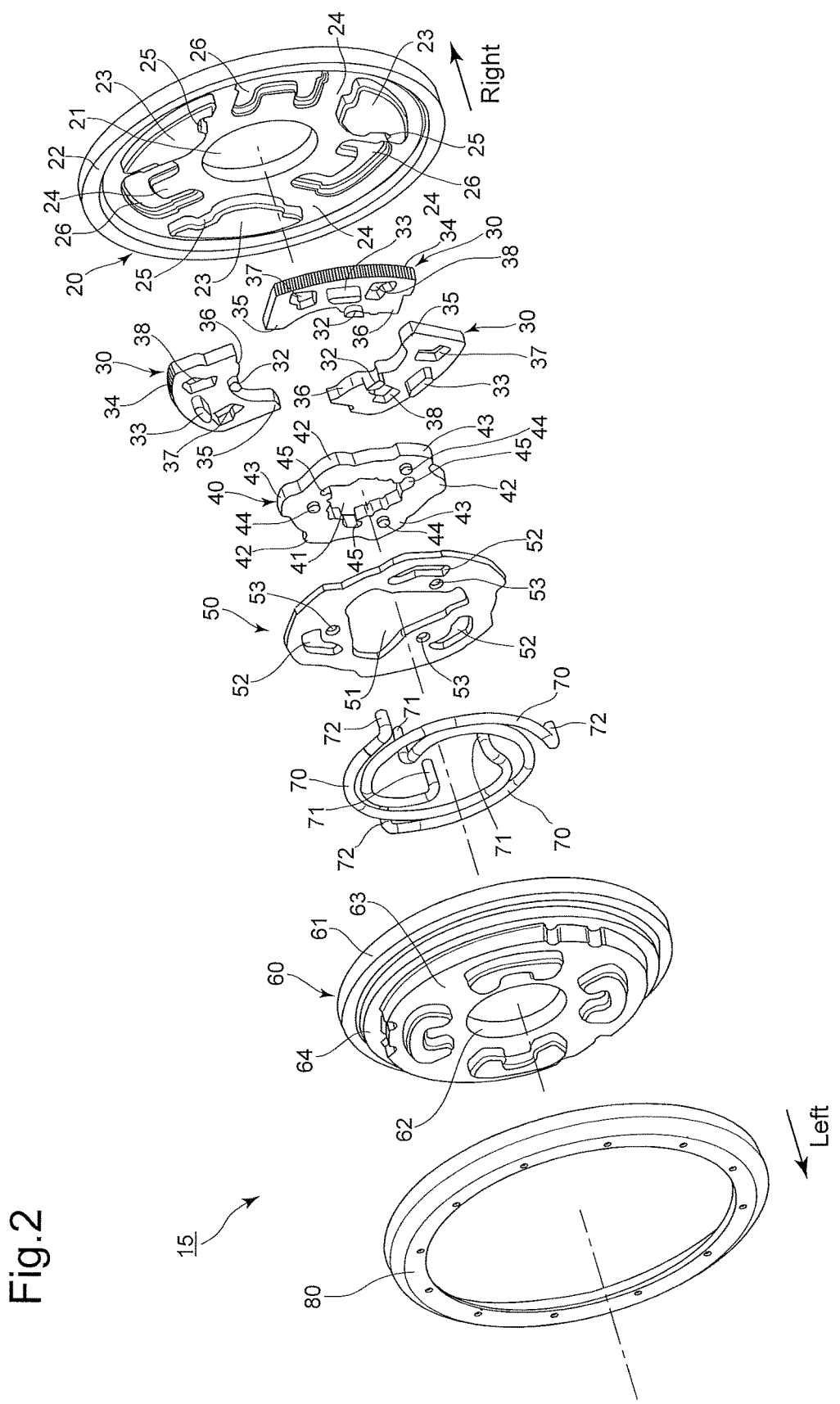
FIG. 2 is an exploded perspective view of a first embodiment of the seat reclining apparatus.

Subsequently, the detailed structure of the first embodiment of the seat reclining apparatus 15 will be hereinafter discussed with reference to FIGS. 2 through 13. As shown in FIG. 2, the seat reclining apparatus 15 is provided with a base plate (base member) 20, three pawls (lock members) 30, a rotational cam (an element of a lock driver) 40, a release plate (an element of the lock driver) 50, a ratchet plate (ratchet) 60, three lock springs (elements of the lock driver) 70 and a retaining ring 80, which are major elements of the seat reclining apparatus 15.

Figure 8:
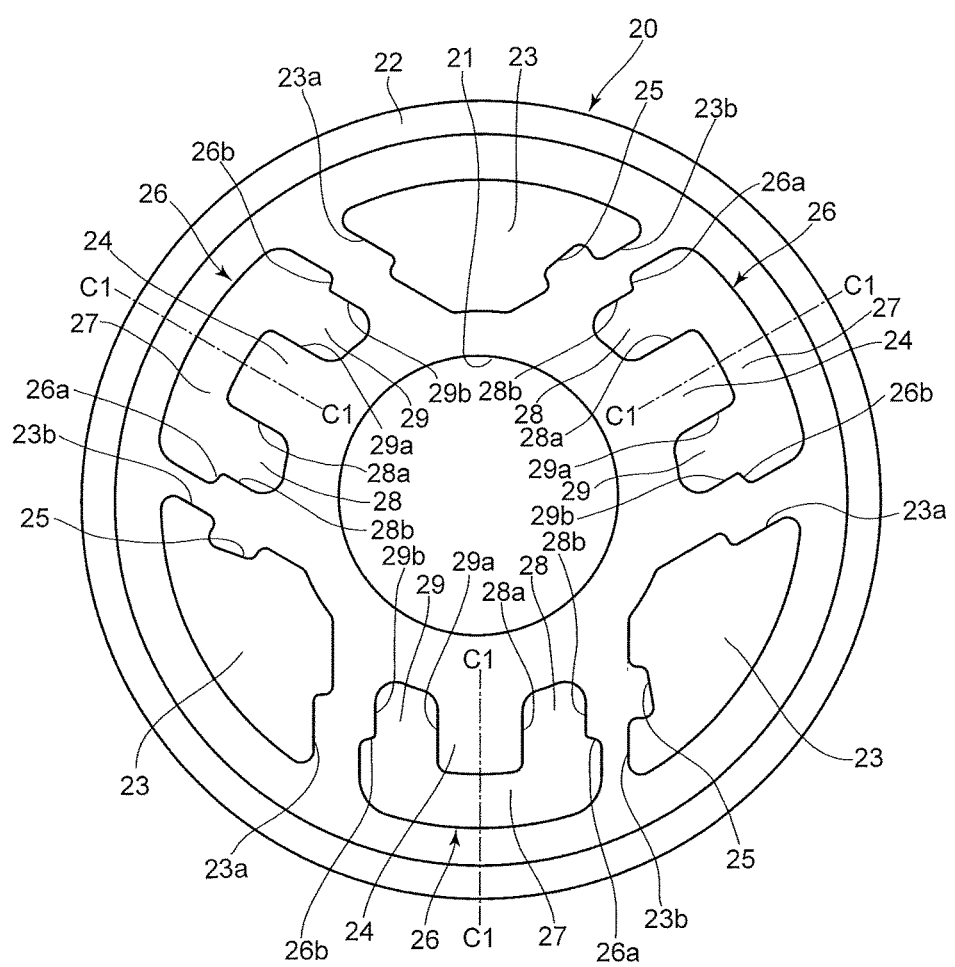
FIG. 8 is a side elevational view of a base plate which constitutes an element of the first embodiment of the seat reclining apparatus.

The base plate 20 is a metal disk member which is formed by press molding. As shown in FIGS. 2 and 8, the base plate 20 is provided in the center thereof with a shaft insertion hole 21 formed as a through-hole which is circular in cross sectional shape. The base plate 20 is provided on the outer edge of the left side thereof with a large-diameter annular flange 22 and has an accommodation space which is formed radially inside the large-diameter annular flange 22. The base plate 20 is provided on the left side thereof with three groove-forming projections 23 which project leftward and are arranged at equi-angular intervals (intervals of 120 degrees) in the circumferential direction about the shaft insertion hole 21. Each groove-forming projection 23 is substantially in the shape of a sector having an increasing circumferential width thereof with respect to a direction from the inner peripheral side to the outer peripheral side. A circular-arc-shaped clearance is formed between the outer peripheral surface of each groove-forming projection 23 and the large-diameter annular flange 22. Both side surfaces of each groove-forming projection 23 with respect to the circumferential direction of the base plate 20 are formed as flat guide surfaces (guide portions) 23a and 23b. As shown in FIG. 8, the flat guide surfaces 23a and 23b (opposed surfaces) of any two adjacent groove-forming projections 23 which face each other in the circumferential direction of the base plate 20 are substantially parallel to each other, and a guide groove (guide portion) 24 is formed therebetween. Accordingly, the three groove-forming projections 23 and the three guide grooves 24 are alternately arranged in the circumferential direction. The base plate 20 is provided, on each groove-forming projection 23 at the midpoint of the flat guide surface thereof, with a spring-engaging recess 25. The base plate 20 is further provided in each guide groove 24 with a pawl guide recess (an element of a meshed-state retainer/engaging portion/depression) 26 which is greater in depth (in the thickness direction of the base plate 20) than the base of the guide groove 24.

The three pawls 30, which are press-molded metal plates, are installed in the three guide grooves 24 of the base plate 20, respectively. Each pawl 30 is provided, on both sides thereon with respect to the circumferential direction, with two slide surfaces which are slidable on the associated flat guide surfaces 23a and 23b therealong. Each pawl 30 is provided on the left side surface thereof with a cam follower 32 and a holding projection (restriction portion) 33, each of which projects leftward. The three pawls 30 are each provided on the circular-arc-shaped outer peripheral surface thereof with an outer toothed portion 34. The three pawls 30 are each provided on the inner peripheral surface thereof with a restricted portion 35 and a pressed portion 36, each of which projects toward the radially inner side. In addition, each pawl 30 is provided on the right side thereof with a pair of guide projections (elements of the meshed-state retainer/engaged portions/protrusions) 37 and 38.

Figure 3:
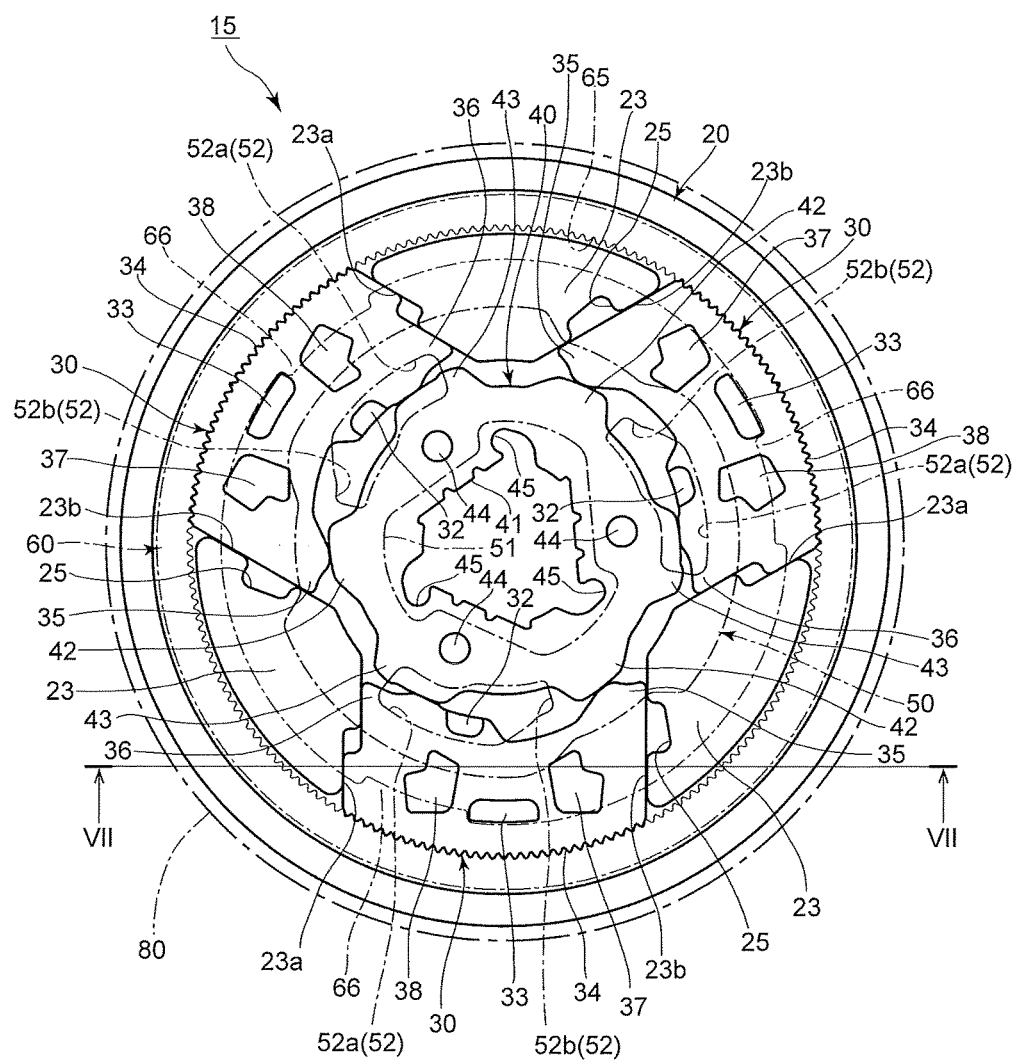
FIG. 3 is a side elevational view of the first embodiment of the seat reclining apparatus in a locked state.
Figure 4:
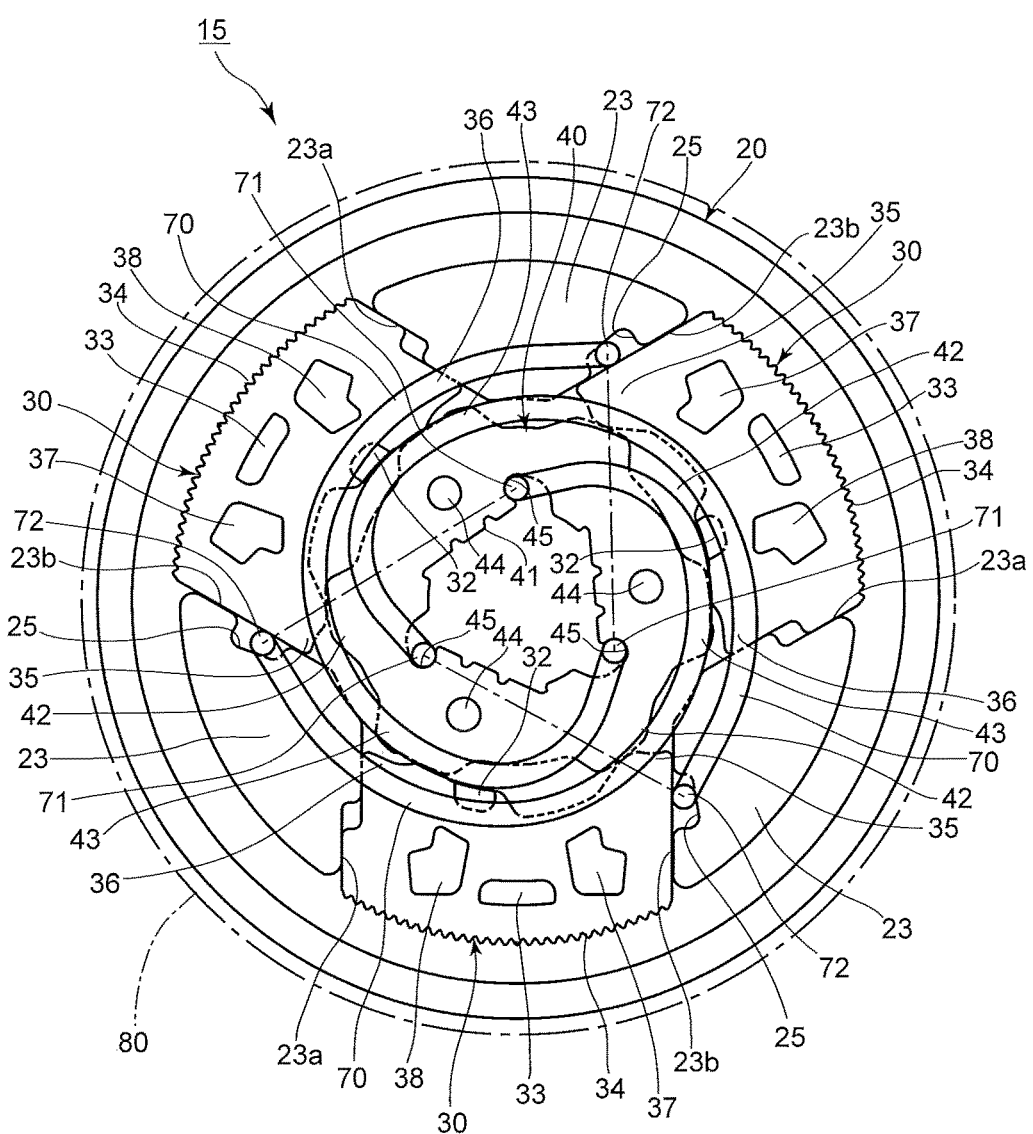
FIG. 4 is a side elevational view of the seat reclining apparatus shown in FIG. 3 from which a release plate and a ratchet plate are omitted, and to which lock springs are added.
Figure 5:
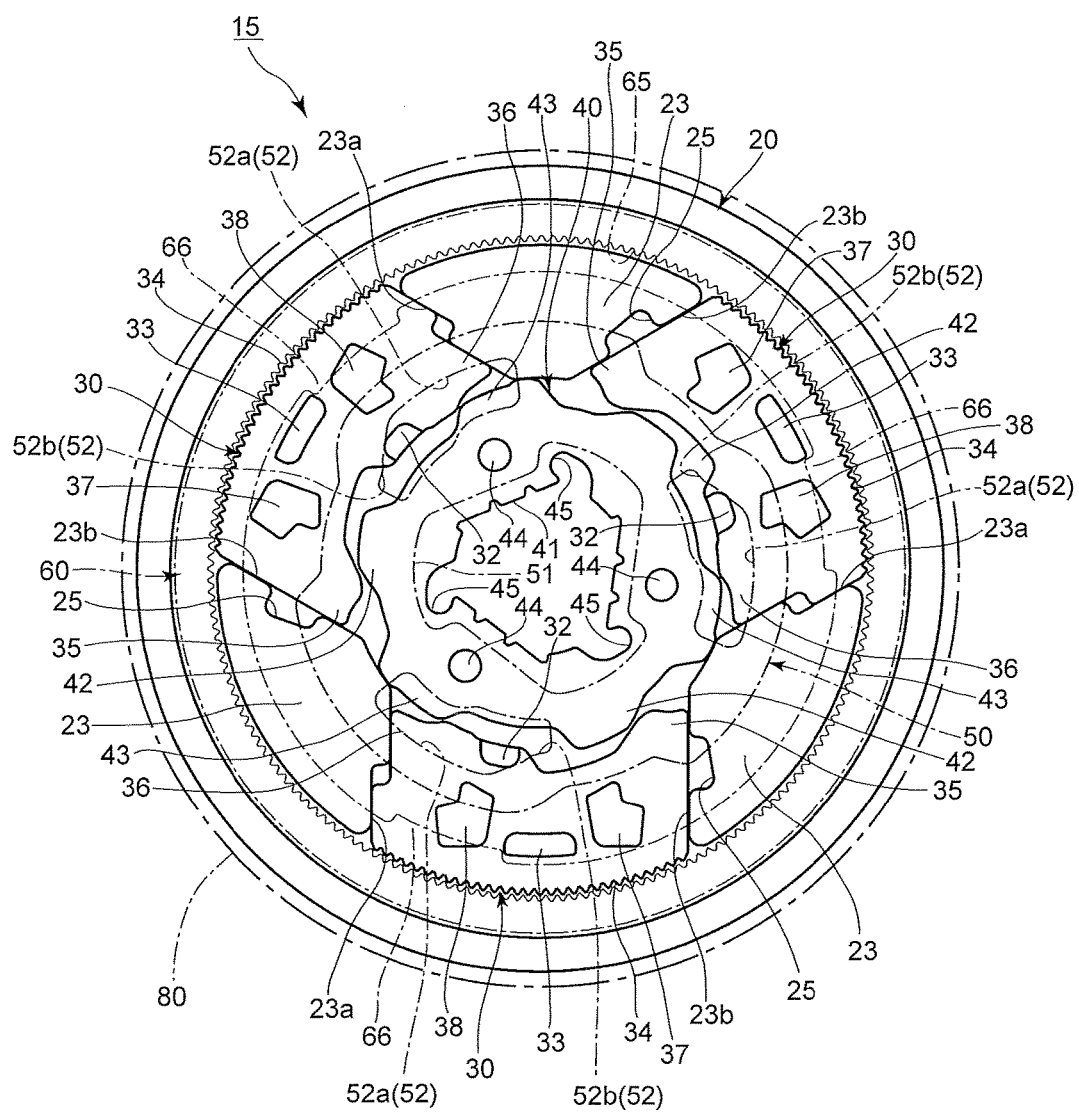
FIG. 5 is a side elevational view of a first embodiment of the seat reclining apparatus in an unlock commencement state, i.e., a state immediately after the seat reclining apparatus starts unlocking.
Figure 10:
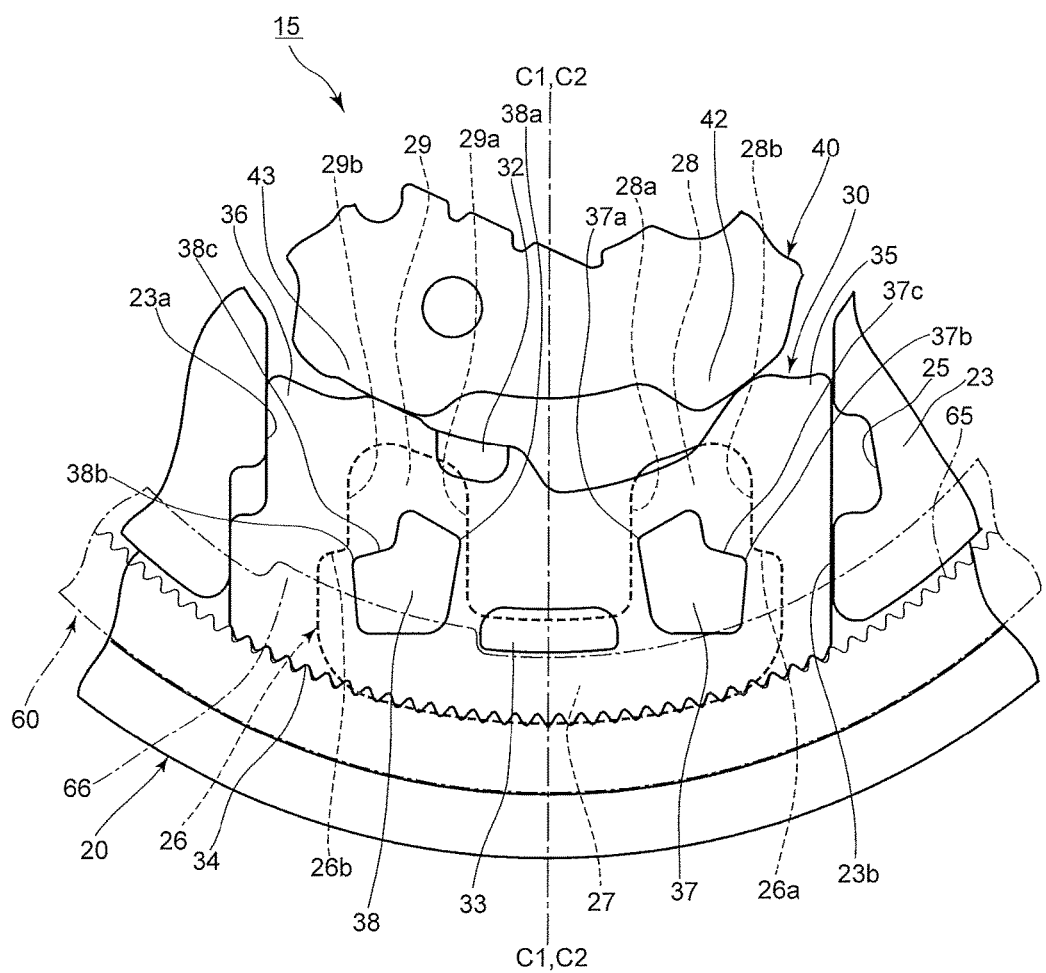
FIG. 10 is an enlarged portion of an elevational view of the first embodiment of the seat reclining apparatus in the vicinity of one of the three pawls in the unlocked state shown in FIG. 3.
Figure 11:
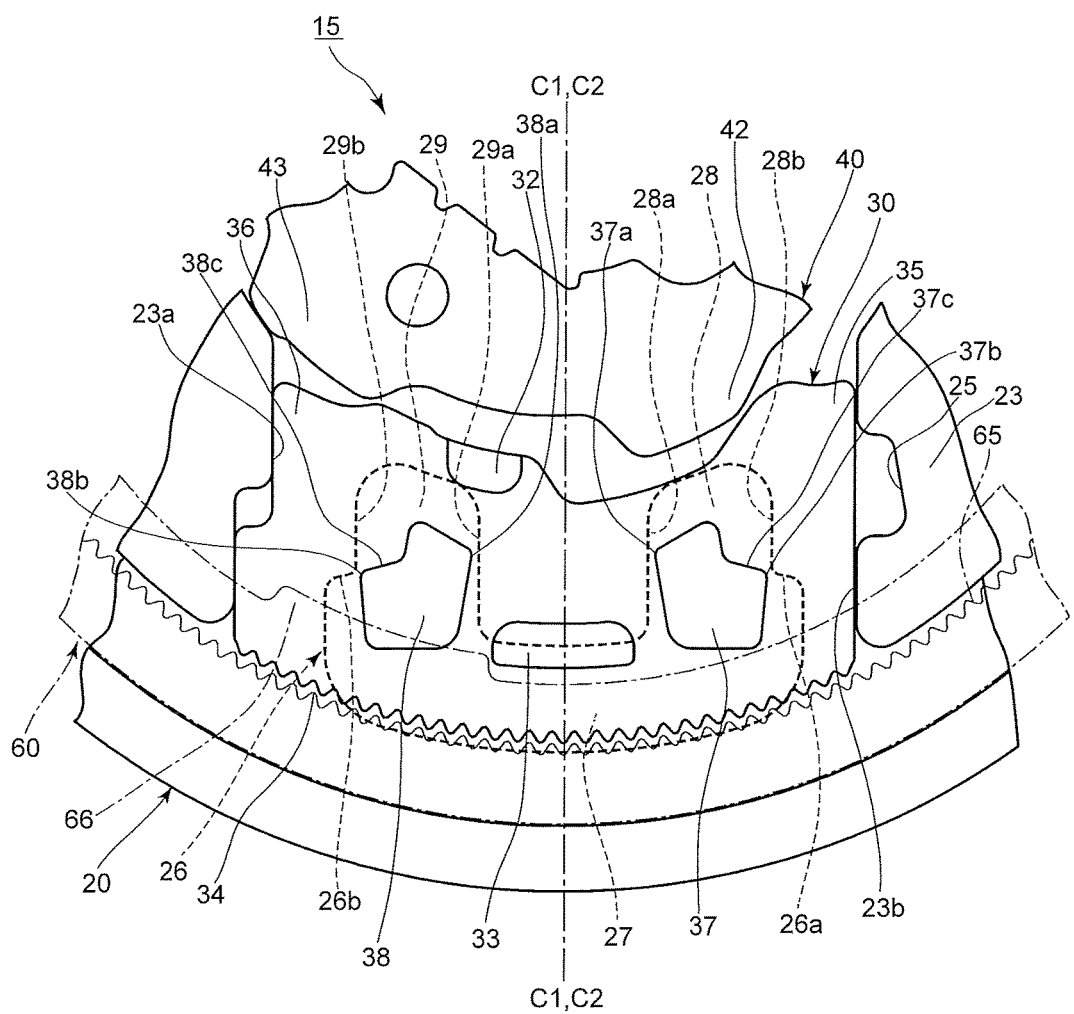
FIG. 11 is an enlarged portion of an elevational view of the first embodiment of the seat reclining apparatus in the vicinity of one of the three pawls in the unlock commencement state shown in FIG. 5.

The three pawls 30 are installed in the three guide grooves 24 in a manner shown in FIGS. 3 through 7 and 10 through 12. Each pawl 30 is in surface contact with the base surface (left side surface) of the associated guide groove 24 to be supported thereby. Each pawl 30 can move in a radial direction of the base plate 20 in the associated guide groove 24 along the flat guide surfaces 23a and 23b of the associated (adjacent) groove-forming projections 23. Each pawl 30 moves radially between an engaged position on the outer peripheral side (shown in FIGS. 3, 4 and 10) in which the pawl 30 is spaced radially outwards from the shaft insertion hole 21 and in which the outer toothed portion 34 meshes with an internal gear (meshing portion) 65 of the ratchet plate 60, and a disengaged position on the inner peripheral side (shown in FIGS. 6 and 12) in which the pawl 30 is positioned closest to the shaft insertion hole 21 and in which the outer toothed portion 34 is disengaged from the internal gear 65 of the ratchet plate 60. FIGS. 5 and 11 show an unlock commencement state, i.e., a state immediately after the seat reclining apparatus 15 starts unlocking. In this state, the pawl 30 has moved off the engaged position and is on the way to the disengaged position. A clearance is secured between each pawl 30 and the associated two adjacent flat guide surfaces 23a and 23b that are positioned at either side of this pawl 30. This clearance allows the pawl 30 to slide smoothly in a radial direction of the base plate 20 and prevents the pawl 30 from rattling excessively.

As shown in FIGS. 7 and 10 through 13, the pair of guide projections 37 and 38 of each pawl 30 are inserted into the associated pawl guide recess 26 with each pawl 30 supported in the associated guide groove 24. Each guide projection 37 and 38 of each pawl 30 is inserted into the associated pawl guide recess 26 with a clearance allowing the pawl 30 to move radially relative to the associated pawl guide recess 26 while being guided by the associated flat guide surfaces 23a and 23b without interference (namely, with a clearance greater than that between the pawl 30 and the associated flat guide surfaces 23a and 23b). The details of the guide projections 37 and 38 of each pawl 30 and the pawl guide recesses 26 will be discussed later.

The rotational cam 40 is a press-molded product formed of a metal plate and substantially identical in thickness to the three pawls 30. As shown in FIGS. 2 through 6, the rotational cam 40 is provided in the center thereof with a non-circular center hole 41, which is formed as a through-hole. The rotational cam 40 is provided, on the outer periphery thereof at substantially equi-angular intervals in the circumferential direction, with three restrictor portions 42 and provided, on the outer periphery thereof at substantially equi-angular intervals in the circumferential direction, with three pawl pressing portions 43. The rotational cam 40 is further provided, on the left side thereof at substantially equi-angular intervals in the circumferential direction, with three rotation stop projections 44. As shown in FIG. 2, the rotation stop projections 44 project leftward. The rotational cam 40 is provided, in the non-circular center hole 41 at substantially equi-angular intervals in the circumferential direction, with three spring-engaging recesses 45. The rotational cam 40 is installed in the center of the aforementioned accommodation space of the base plate 20, and the three pawls 30 are positioned radially outside the portions of the rotational cam 40 on which the three pawl pressing portions 43 are formed, respectively (see FIGS. 3 through 6).

The release plate 50 is a press-molded metal plate and provided, at substantially equi-angular intervals in the circumferential direction around a center hole 51 formed in the center of the release plate 50, with three cam holes 52 which are formed as through-holes. As shown in FIGS. 3 through 6, the center hole 51 is greater in size than the non-circular center hole 41 of the rotational cam 40. The release plate 50 is provided in each cam hole 52 with a lock-allowing cam portion 52a and an unlocking cam portion 52b. The lock-allowing cam portion 52a that is provided in each cam hole 52 is formed on a portion of the release plate 50 which is farther from the center hole 51 than the unlocking cam portion 52b, thus being closer to the outer peripheral side than the unlocking cam portion 52b, while the unlocking cam portion 52b is formed on a portion of the release plate 50 which is closer to the center hole 51 than the lock-allowing cam portion 52a, thus being closer to the inner peripheral side than the lock-allowing cam portion 52a. The release plate 50 is further provided, at equi-angular intervals in the circumferential direction, with three rotation stop holes 53.

Figure 6:
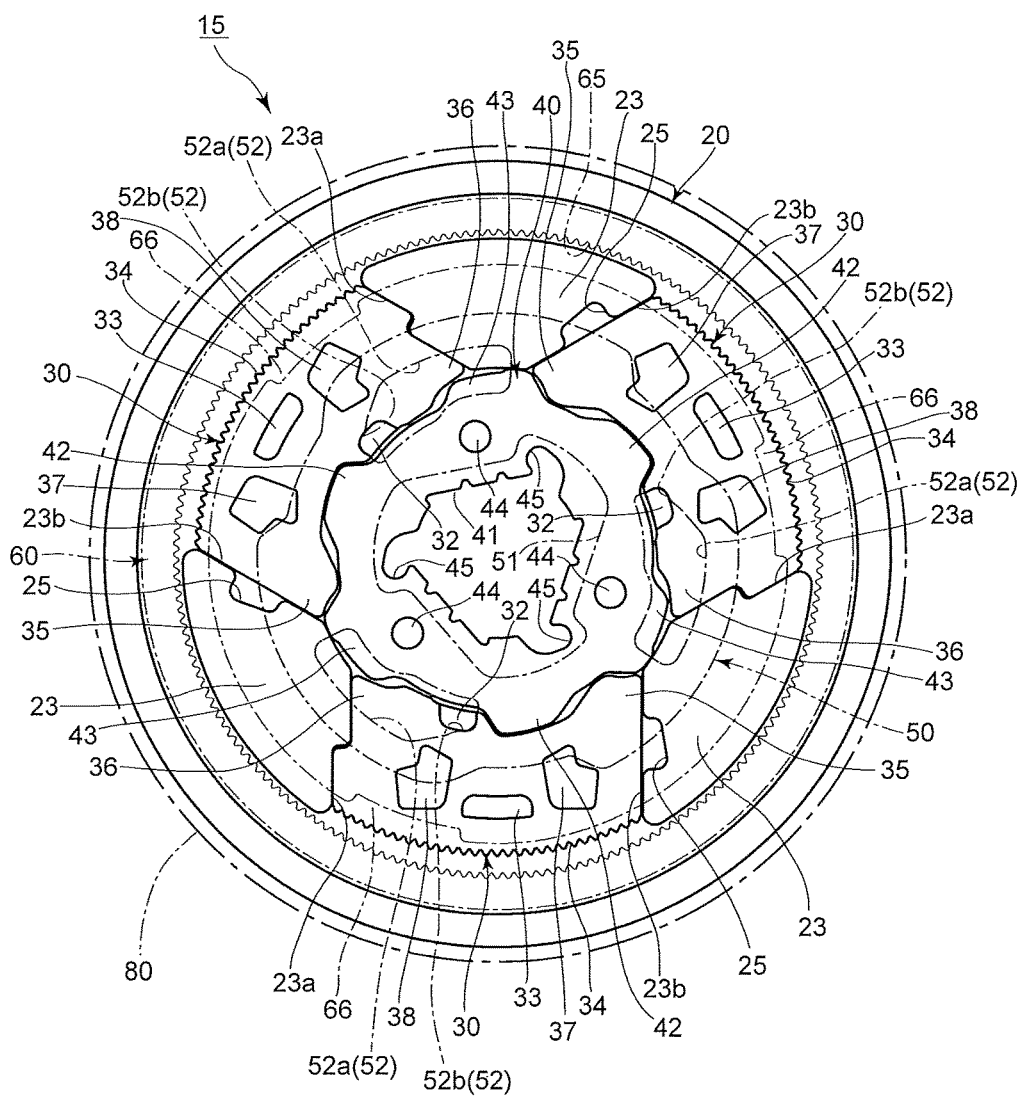
FIG. 6 is a side elevational view of the first embodiment of the seat reclining apparatus in an unlocked state.

The release plate 50 is connected to the rotational cam 40 by fitting the three rotation stop projections 44 into the three rotation stop holes 53. The rotational cam 40 and the release plate 50 are prevented from rotating relative to each other by the engagement between the three rotation stop projections 44 and the three rotation stop holes 53, so that the rotational cam 40 and the release plate 50 integrally rotates as one. In addition, the cam followers 32 of the three pawls 30 are inserted into the three cam holes 52 of the release plate 50. As shown in FIG. 6, each pawl 30 is prevented from moving toward the inner peripheral side beyond the disengaged position by engagement of the cam follower 32 of the pawl 30 with the unlocking cam portion 52b of the associated cam hole 52.

The ratchet plate 60 is a press-molded metal product which is shaped into a disk. The ratchet plate 60 is provided on the outer edge of the right side thereof with a small-diameter annular flange 61 having a circular shape which projects rightward and has an accommodation space which is formed radially inside the small-diameter annular flange 61. As shown in FIG. 2, the ratchet plate 60 is provided at the center thereof with a shaft insertion hole 62 formed as a through-hole which is circular in cross sectional shape. A radially innermost portion of the ratchet plate 60 that is closest to the shaft insertion hole 62 is formed as a disk-shaped base portion 63. The ratchet plate 60 is provided at a radial position between the base portion 63 and the small-diameter annular flange 61 with an intermediate annular portion 64. As can be seen from FIG. 7, the intermediate annular portion 64 is positioned one step to the left of the small-diameter annular flange 61 and is smaller in diameter than the small-diameter annular flange 61. The ratchet plate is provided on the inner peripheral surface of the small-diameter annular flange 61 with the aforementioned internal gear (meshing portion) 65. The ratchet plate 60 is provided, on the inner peripheral surface of the intermediate annular portion 64 at equi-angular intervals in the circumferential direction, with three unlocked-state holding projections (contact portions) 66 which project toward the inner peripheral side. Each unlocked-state holding projection 66 is elongated in the circumferential direction of the ratchet plate 60, and the inner periphery of each unlocked-state holding projection 66 is in the shape of a circular arc with the curvature center thereof on the axis of the ratchet plate 60.

Figure 7:
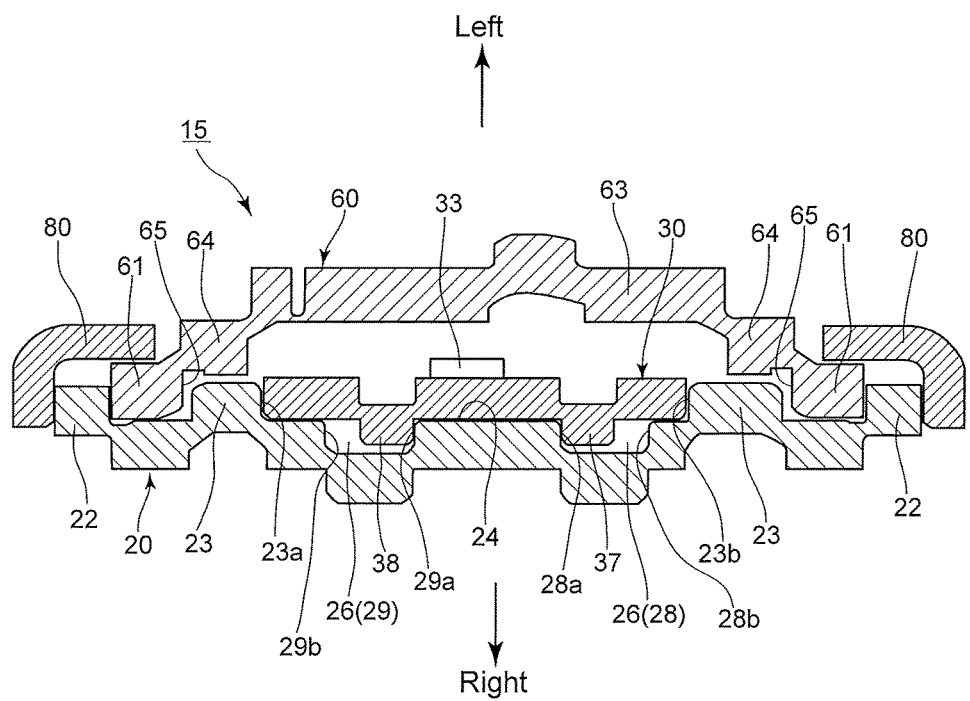
FIG. 7 is a sectional view taken along the line VII-VII shown in FIG. 3.

The ratchet plate 60 is installed to cover the left side of the base plate 20 with the small-diameter annular flange 61 inserted into the gap between the inner periphery of the large-diameter annular flange 22 and the outer peripheries of the three groove-forming projections 23 (see FIG. 7). With the base plate 20 covered by the ratchet plate 60, the outer toothed portions 34 of the three pawls 30 radially face the internal gear 65 of the ratchet plate 60. The three lock springs 70 are installed in the space between the ratchet plate 60 and the base plate 20. As shown in FIGS. 2 and 4, each lock spring 70 is made of a curved metal wire. One end of each lock spring 70 is bent rightward to be formed into a first hook 71, while the other end of the same is bent rightward to be formed into a second hook 72. Each lock spring 70 is installed by engaging the first hook 71 in the associated spring-engaging recess 45 of the rotational cam 40 and engaging the second hook in the spring-engaging recess 25 of the associated groove-forming projection 23. When each lock spring 70 is installed onto the base plate 20 and the rotational cam 40 in this manner, each lock spring 70 is resiliently deformed to produce a biasing force that urges the rotational cam 40 to rotate in one direction. This biasing force is a force which urges the rotational cam 40 to rotate counterclockwise with respect to FIGS. 3 through 6, and this biasing force in the same direction is also exerted on the release plate 50 that is integral with the rotational cam 40 in the rotational direction.

The retaining ring 80 is an annular ring member made of metal. As shown in FIG. 7, the retaining ring 80 is fixed to the base plate 20 by covering the large-diameter annular flange 22 of the base plate 20 and the small-diameter annular flange 61 of the ratchet plate 60 with the retaining ring 80 fitted onto the outer peripheral surface of the large-diameter annular flange 22 of the base plate 20 and the left side surface of the small-diameter annular flange 61 of the ratchet plate 60. In this fixed state, the ratchet plate 60 is sandwiched between the base plate 20 and the retaining ring 80, and the ratchet plate 60 is rotatable relative to the base plate 20 along the inner peripheral surface of the large-diameter annular flange 22 without coming off the base plate 20 and the retaining ring 80.

The base plate 20 is fixed to the aforementioned pair of left and right rear frames (not shown) that are elements of the seat cushion 11, and the ratchet plate 60 is fixed to the aforementioned pair of left and right seatback frames (not shown) that are elements of the seatback 12.

An operating lever 90 (see FIG. 1) which can be manually rotated is fixed to a side (the right side) of the seat reclining apparatus 15. A shaft (rotational shaft member) 91 (see FIG. 1) is inserted into the seat reclining apparatus 15 through the radial center thereof. The axis of the shaft 91 is substantially coincident with the rotational center of the ratchet plate 60. Manually rotating the operating lever 90 causes the shaft 91 to rotate on the axis thereof. The shaft 91 passes through the shaft insertion hole 21, the non-circular center hole 41, the center hole 51 and the shaft insertion hole 62; among these holes, the shaft 91 is engaged with the non-circular center hole 41 while being prevented from rotating relative to the non-circular center hole 41. Therefore, when the shaft 91 rotates, the rotational cam 40 and the release plate 50 integrally rotate.

Operations of the seat reclining apparatus 15 will be hereinafter discussed with reference to FIGS. 3 through 6 and 10 through 12. In each of these drawings, the release plate 50, the ratchet plate 60 and retaining ring 80, which are positioned in front of the drawing sheet of paper (i.e., positioned on the left side of the pawls 30 and the rotational cam 40), are shown by imaginary lines (one-dot chain lines).

When no operating force is applied to the rotational cam 40 and the release plate 50, the seat reclining apparatus 15 is in a locked state that is shown in FIGS. 3, 4 and 10. The positions of the rotational cam 40 and the release plate 50 at this time are referred to as the locked positions. When the seat reclining apparatus 15 is in a locked state, the rotational cam 40 and the release plate 50 are each held in the locked position by the biasing force of the lock springs 70 (which bias the rotational cam 40 and the release plate 50 counterclockwise with respect to FIGS. 3, 4 and 10). When the rotational cam 40 is in the locked position, the three pawl pressing portions 43 press the pressed portions 36 of the three pawls 30 in the locking direction (toward the outer peripheral side). Each pawl 30 thus pressed in the locking direction is held in the engaged position, in which the outer toothed portion 34 of the pawl 30 is in mesh with the internal gear 65 of the ratchet plate 60, which prevents the base plate 20 and the ratchet plate 60 from rotating relative to each other. Accordingly, the seatback 12 is prevented from tilting (rotating) relative to the seat cushion 11. When the release plate 50 is in the locked position, the cam follower 32 of each pawl 30 is positioned in the lock-allowing cam portion 52a of the associated cam hole 52, and the release plate 50 is not involved in the position setting of each pawl 30. In addition, during the time each pawl 30 moves to the locked position or in the state where each pawl 30 is held in the locked position, the three restrictor portions 42 of the rotational cam 40 are not normally in contact with the restricted portions 35 of the three pawls 30; the three restrictor portions 42 of the rotational cam 40 and the restricted portions 35 of the three pawls 30 come into contact with each other only when the pawls 30 tilt.

Rotating the operating lever 90 counterclockwise with respect to FIG. 1 from the position shown by a solid line in FIG. 1 to the position shown by a two-dot chain line in FIG. 1 against the rotational biasing force of each lock spring 70 causes the rotational cam 40 and the release plate 50 to rotate clockwise with respect to FIG. 3 (in the unlocking direction) via the shaft 91 (shown in FIG. 1). When the release plate 50 rotates in the unlocking direction from the locked position, the cam follower 32 of each pawl 30 changes the position thereof in the associated cam hole 52, which is formed in the release plate 50, from the lock-allowing cam portion 52a to the unlocking cam portion 52b thereof and is pressed toward the inner peripheral side by the inner surface of the associated cam hole 52, which causes each pawl 30 to move in the associated guide groove 24 toward the inner peripheral side. At this time, the rotational cam 40 moves to thereby move the three pawl pressing portions 43 in the direction opposite to the (pawl-pressing) direction thereof when each pawl 30 are pressed, thus not interfering with the movement of each pawl 30 that is caused by the rotation of the release plate 50 in the unlocking direction.

Figure 12:
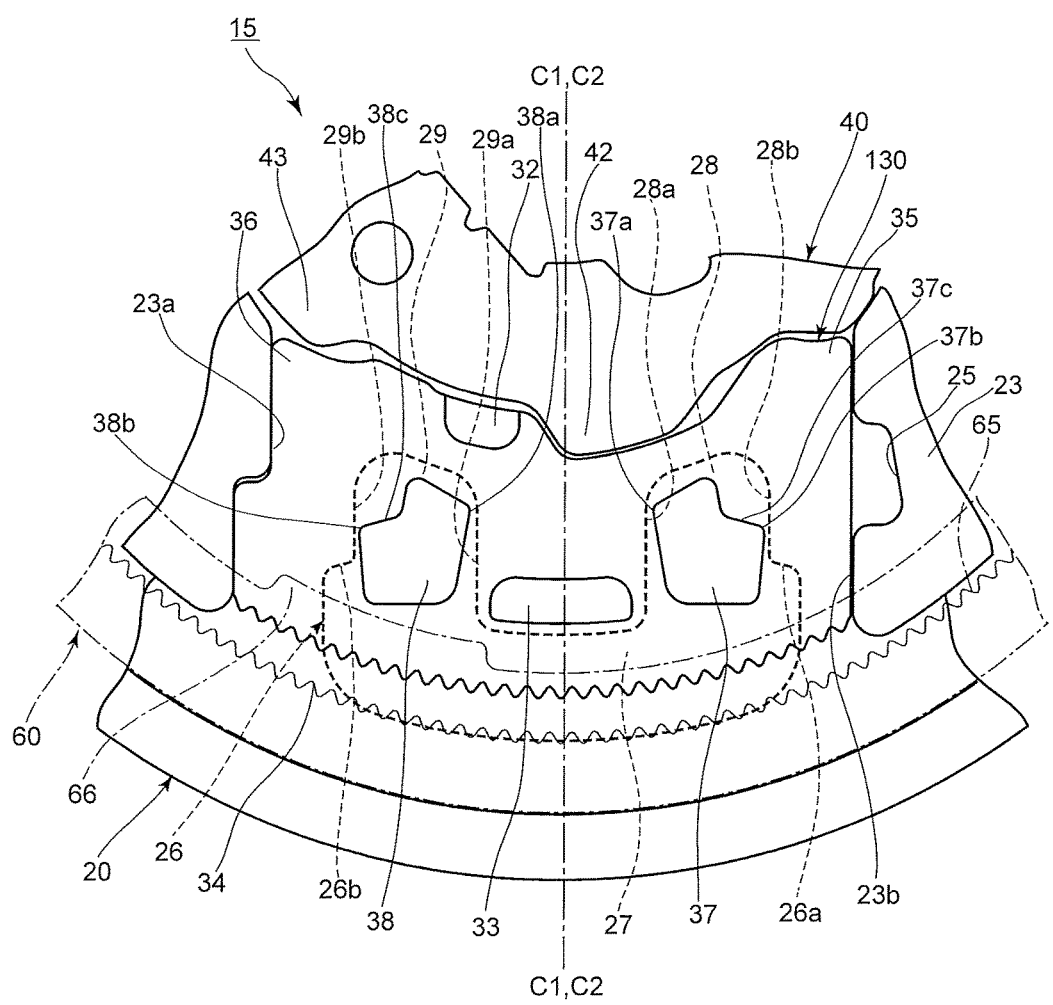
FIG. 12 is an enlarged portion of an elevational view of the first embodiment of the seat reclining apparatus in the vicinity of one of the three pawls in the unlocked state shown in FIG. 6.

FIGS. 5 and 11 show the unlock commencement state, i.e., a state immediately after the seat reclining apparatus starts unlocking, specifically a state immediately after the outer toothed portion 34 of each pawl 30 starts being disengaged from the internal gear 65 of the ratchet plate 60 by a movement of each pawl 30 toward the inner peripheral side. Upon each of the rotational cam 40 and the release plate 50 rotating to the unlocked position shown in FIGS. 6 and 12, each pawl 30 reaches the engagement releasing position thereof at which the outer toothed portion 34 of each pawl 30 is totally disengaged from the internal gear 65 of the ratchet plate 60. This disengagement of the outer toothed portion 34 of each pawl 30 from the internal gear 65 of the ratchet plate 60 allows the base plate 20 and the ratchet plate 60 to rotate relative to each other. Namely, the seat reclining apparatus 15 enters into an unlocked state, in which the seatback 12 can be tilted relative to the seat cushion 11. As shown in FIGS. 6 and 12, when the seat reclining apparatus 15 is in an unlocked state, each of the three restrictor portions 42 of the cam member 40 (which project radially outwards) fits into a recess (which is recessed radially outwards) formed between the restricted portion 35 and the pressed portion 36 on the associated pawl 30, and each of the three pawl pressing portions 43 of the cam member 40 fits into a spaces formed between two of the three pawls 30 adjacent to each other, which makes it possible to move each pawl 30 to the engagement releasing position without being interfered with by the cam member 40.

Upon releasing the operating lever 90 in the unlocked state shown in FIGS. 6 and 12, the rotational cam 40 and the release plate 50 rotate counterclockwise toward the locked position (shown in FIGS. 3, 4 and 10) from the unlocked position by the biasing force of the each lock spring 70. This rotation of the cam ring 40 toward the locked position causes the three pawl pressing portions 43 of the cam ring 40 to press the pressed portions 36 of the three pawls 30 accordingly, thus causing each pawl 30 to move toward the outer peripheral side in the associated guide groove 24 to consequently reach the engaged position (shown in FIGS. 3, 4 and 10).

When the holding projections 33 of the three pawls 30 and the three unlocked-state holding projections 66 of the ratchet plate 60 are positioned to face each other radially, the outer peripheral surfaces of the holding projections 33 of the three pawls 30 are engaged with the inner peripheral surfaces of the three unlocked-state holding projections 66, which prevents each pawl 30 from moving toward the outer peripheral side. At this stage, the outer toothed portion 34 of each pawl 30 and the internal gear 65 of the ratchet plate 60 are not engaged with each other, so that rotation of the ratchet plate 60 relative to the base plate 20 is not restricted. In other words, the seat reclining apparatus 15 enters into the aforementioned unlocked-state holding state (i.e., a state in which the seat reclining apparatus 15 is held in the unlocked state) even if the unlocking operation does not continue. The seat reclining apparatus 15 enters into the unlocked-state holding state when the seatback 12 is positioned in between the first-stage locked position 12C and the forwardly-tilted position 12A that are shown in FIG. 1, and the circumferential lengths and the relative position between the holding projections 33 and the three unlocked-state holding projections 66 are predetermined so as to engage with each other (radially face each other) in the range from the first-stage locked position 12C to the forwardly-tilted position 12A. Raising the seatback 12 to the first-stage locked position 12C causes the unlocked-state holding state (a state in which the holding projections 33 and the three unlocked-state holding projections 66 radially face each other) to be released, thus causing the seat reclining apparatus 15 to come into a locked state, shown in FIGS. 3, 4 and 10, by the biasing force of each lock spring 70. When the seat reclining apparatus 15 is in a locked state, the outer peripheral surfaces of the holding projections 33 of the three pawls 30 are positioned closer to the outer peripheral side than the inner peripheral surfaces of the three unlocked-state holding projections 66.

As described above, the base plate 20 is provided with the three pawl guide recesses 26 that are arranged at different circumferential positions, each of the three pawls 30 is provided with one guide projection 37 and one guide projection 38, and the guide projections 37 and 38 of each pawl 30 are inserted into the associated pawl guide recess 26. The details of the three pawl guide recesses 26, the three guide projections 37 and the three guide projections 38 will be discussed hereinafter.

As shown in FIG. 8, each pawl guide recess 26 is provided with a bridging portion 27 which extends in the circumferential direction of the base plate 20 and a pair of grooves 28 and 29 which extend toward the inner peripheral side from the bridging portion 27. Each pawl guide recess 26 has a substantially symmetrical shape with respect to an associated center line C1 which passes through the center (with respect to the circumferential direction) of the associated guide groove 24 and extends in a radial direction of the base plate 20. An inner side surface 28a and an outer side surface 28b which face each other in the circumferential direction of the base plate 20 are formed in the groove 28 of each pawl guide recess 26, and an inner side surface 29a and an outer side surface 29b which face each other in the circumferential direction of the base plate 20 are formed in the groove 29 of each pawl guide recess 26. Each inner side surface 28a and 29a is positioned on the near side to the associated center line C1, while each outer side surface 28b and 29b is positioned on the far side from the associated center line C1. The inner side surface 28a, the outer side surface 28b, the inner side surface 29a and the outer side surface 29b of each pawl guide recess 26 are all substantially parallel to the flat guide surfaces 23a and 23b of the associated (adjacent) groove-forming projections 23. An inclined guide surface 26a and an inclined guide surface 26b are further formed in each pawl guide recess 26. The inclined guide surface 26a is formed to be continuous with the outer peripheral-side end of the outer side surface 28b, and the inclined guide surface 26b is formed to be continuous with the outer peripheral-side end of the outer side surface 29b. The inclined guide surface 26a is an inclined surface which is inclined away from the associated center line C1 in a direction toward the outer peripheral side (toward the associated bridging portion 27) away from the outer side surface 28b, and the inclined guide surface 26b is an inclined surface which is inclined away from the associated center line C1 in a direction toward the outer peripheral side (toward the associated bridging portion 27) away from the outer side surface 29b. The inclined guide surface 26a and the inclined guide surface 26b of each pawl guide recess 26 are shaped to be substantially symmetrical with respect to the associated center line C1.

Figure 9:
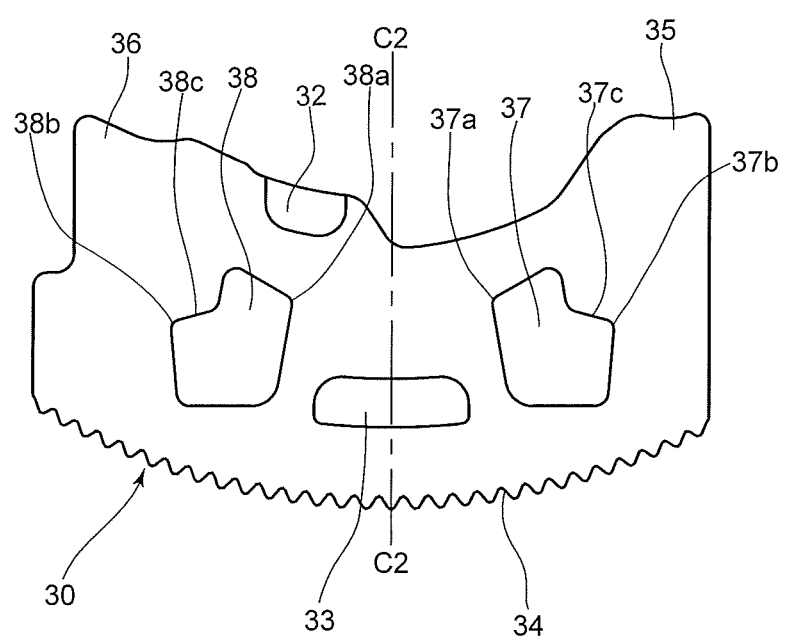
FIG. 9 is a side elevational view of one of the three pawls shown in FIGS. 2 through 6 which constitute elements of the first embodiment of the seat reclining apparatus.

As shown in FIG. 9, the guide projections 37 and 38 of each pawl 30 are shaped to be substantially symmetrical with respect to a center line C2 of the pawl 30 which passes through the center (with respect to the circumferential direction) of the pawl 30 and extends in a radial direction of the base plate 20. The holding projection 33 of each pawl 30 is provided on the center line C2 thereof, and the guide projections 37 and 38 of each pawl 30 are positioned on the opposite sides of the holding projection 33 in the circumferential direction. The guide projection 37 of each pawl 30 is provided, on the near and far sides thereof from the associated center line C2, with a corner 37a and a corner 37b, respectively, and the guide projection 38 of each pawl 30 is provided, on the near and far sides thereof from the associated center line C2, with a corner 38a and a corner 38b, respectively. The guide projection 37 of each pawl 30 is further provided with an inclined guide surface 37c at a position nearer to the inner peripheral side than the corner 37b, and the guide projection 38 of each pawl 30 is further provided with an inclined guide surface 38c at a position nearer to the inner peripheral side than the corner 38b. The inclined guide surface 37c is an inclined surface which is inclined toward the associated center line C2 in a direction toward the inner peripheral side away from the corner 37b, and the inclined guide surface 38c is an inclined surface which is inclined toward the associated center line C2 in a direction toward the inner peripheral side away from the corner 38b. The inclined guide surface 37c and the inclined guide surface 38c of each pawl 30 are shaped to be substantially symmetrical with respect to the associated center line C2.

When the seat reclining apparatus 15 is in a locked state (shown in FIGS. 3 and 4), the guide projections 37 and 38 of each pawl 30 are located relative to the associated pawl guide recess 26 at the positions shown in FIG. 10. In this state, the corner 37a faces the inner side surface 28a of the associated groove 28, the corner 38a faces the inner side surface 29a of the associated groove 29, and the corners 37b and 38b are positioned closer to the outer peripheral side (the bridging portion 27 side) than the outer side surfaces 28b and 29b, respectively.

Upon the seat reclining apparatus 15 entering into the unlock commencement state (shown in FIG. 5), the three pawls 30 move toward the inner peripheral side, which causes the guide projections 37 and 38 of each pawl 30 to move toward the inner peripheral side relative to the associated pawl guide recess 26 to come into the state shown in FIG. 11. In this state, the corner 37b is positioned close to the boundary between the inclined guide surface 26a and the outer side surface 28b, and the corner 38b is positioned close to the boundary between the inclined guide surface 26b and the outer side surface 29b in the radial direction of the base plate 20.

Upon the seat reclining apparatus 15 entering into an unlocked state (shown in FIG. 6), the three pawls 30 further move toward the inner peripheral side, which causes the guide projections 37 and 38 of each pawl 30 to come into the state shown in FIG. 12 relative to the associated pawl guide recess 26. In this state, major parts of the guide projections 37 and 38 of each pawl 30 enter the grooves 28 and 29 of the associated pawl guide recess 26 in the radial direction of the base plate 20, the corner 37a and the corner 38a face the inner side surface 28a and the inner side surface 29a, respectively, and additionally, the corner 37b and the corner 38b face the outer side surface 28b and the outer side surface 29b, respectively. The inclined guide surface 37c and the inclined guide surface 38c of each pawl 30 are positioned inside the groove 28 and the groove 29 of the associated pawl guide recess 26, respectively.

As shown in FIG. 12, in each pawl 30, the width of the guide projection 37 (the distance between the corners 37a and 37b) is smaller than the width of the associated groove 28 (the distance between the inner side surface 28a and the outer side surface 28b) in the circumferential direction, so that a clearance exists between the guide projection 37 and the associated groove 28 in the circumferential direction with the guide projection 37 positioned in the associated groove 28. Similarly, in each pawl 30, the width of the guide projection 38 (the distance between the corners 38a and 38b) is smaller than the width of the associated groove 29 (the distance between the inner side surface 29a and the outer side surface 29b) in the circumferential direction, so that a clearance exists between the guide projection 38 and the associated groove 29 in the circumferential direction with the guide projection 38 positioned in the associated groove 29. These clearances are each set to be greater than the clearance between each pawl 30 and the associated flat guide surfaces 23a and 23b. Accordingly, when each pawl 30 moves in a radial direction of the base plate 20 in a no mal operating state between the engaged position (shown in FIGS. 3, 4 and 10) and the disengaged position (shown in FIGS. 6 and 12), the guide projections 37 and 38 of each pawl 30 do not interfere with the inner surface of the associated pawl guide recess 26, thus not interfering with the operation of each pawl 30.

Figure 13:
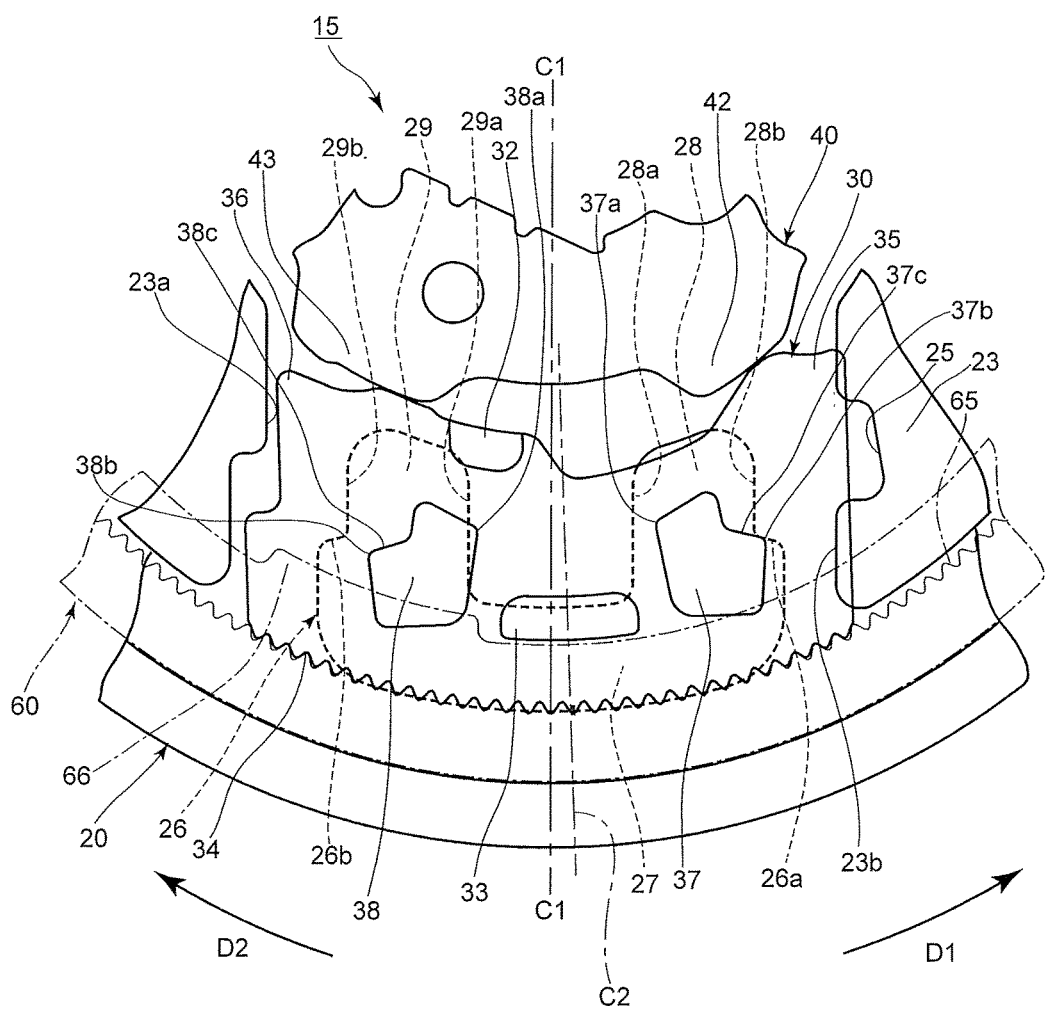
FIG. 13 is an enlarged portion of an elevational view of the first embodiment of the seat reclining apparatus in the vicinity of one of the three pawls in a state where this pawl has moved circumferentially.

FIG. 13 shows the case where an excessive load in a direction D1 shown in FIG. 13 is exerted on one pawl 30 when the seat reclining apparatus 15 is in a locked state (shown in FIGS. 3, 4 and 10). Each center line C1 and the associated center line C2 substantially match with each other in the normal operating state shown in FIGS. 10 through 12, whereas the center line C2 is inclined in the direction D1 by a movement (or deformation) of the pawl 30 in the circumferential direction due to the excessive load in the direction D1. In accordance with this positional variation of the pawl 30 due to the excessive load, the inclined guide surface 37c of the guide projection 37 of the pawl 30 and the inclined guide surface 26a of the associated pawl guide recess 26 are in contact with each other. The inclined guide surface 37c of the guide projection 37 of the pawl 30 and the inclined guide surface 26a of the associated pawl guide recess 26 are surfaces which create a component of force that presses the associated pawl 30 toward the outer peripheral side against the load in the direction D1, and this component of force causes a force acting on the pawl 30 to press the outer toothed portion 34 thereof against the internal gear 65 of the ratchet plate 60. This force against the internal gear 65 strongly acts especially on a portion of the pawl 30 in the circumferential direction on which the guide projection 37 is formed (i.e., a portion of the pawl 30 which is closer to the front in the direction D1 than the center line C2). As a result, in a locked state of the seatback 12 with respect to the seat cushion 11, even when an extremely large force in a tilting direction which may tilt or deform the pawl(s) 30 is exerted on the seat reclining apparatus 15 (even when a force in a direction different from the directions in which the pawls 30 are guided by the guide grooves 24 is exerted on the pawls 30) with the seatback 12 locked with respect to the seat cushion 11, the engagement between the outer toothed portion 34 of each pawl 30 and the internal gear 65 of the ratchet plate 60 can be reliably maintained, which makes it possible to achieve high level of safety. In the condition shown in FIG. 13, the restrictor portion 42 of the rotational cam 40 and the restricted portion 35 of the associated e pawl 30 are already in contact with each other before the inclined guide surface 37c of the guide projection 37 of the pawl 30 and the inclined guide surface 26a of the pawl guide recess 26 of the base plate 20 come in contact with each other.

Although not shown in the drawings, in the case where each pawl 30 is acted upon by an excessive load in a direction D2 (shown in FIG. 13) which is opposite to the direction D1 when the seat reclining apparatus 15 is in a locked state, the inclined guide surface 38c of the guide projection 38 of each pawl 30 comes into contact with and presses the inclined guide surface 26b of the associated pawl guide recess 26 to thereby create a component of force that presses the pawl 30 toward the outer peripheral side against the load in the direction D2. This component of force causes a force acting on the pawl 30 to press the outer toothed portion 34 thereof against the internal gear 65 of the ratchet plate 60, which makes it possible to reliably maintain the engagement between the outer toothed portion 34 of each pawl 30 and the internal gear 65 of the ratchet plate 60.

In addition, each pawl 30 can be prevented from tilting or becoming deformed more than that shown in FIG. 13 by engagement of portions of the guide projections 37 and 38 of each pawl 30, except the inclined guide surfaces 37c and 38c, with the inner surface of the associated pawl guide recess 26.

A second embodiment of the seat reclining apparatus 16 according to the present invention will be hereinafter discussed with reference to FIGS. 14 through 17. In the second embodiment of the seat reclining apparatus 16, a pair of guide projections (elements of a meshed-state retainer/engaged portions/protrusions) 137 and 138 of each pawl (lock member) 130 are inserted into associated one of three pawl guide recesses (elements of the meshed-state retainer/engaging portion/depression) 126 formed on a base plate (base member) 120. The second embodiment of the seat reclining apparatus 16 is the same as the first embodiment of the seat reclining apparatus 15 except that each pawl guide recess 126 of the base plate 120 and the pair of guide projections 137 and 138 of each pawl 130 are different in shape from each pawl guide recess 26 of the base plate 20 and the pair of guide projections 37 and 38 of each pawl 30 of the first embodiment of the seat reclining apparatus 15. The descriptions about portions of the second embodiment of the seat reclining apparatus 16 which are the same as those of the first embodiment of the seat reclining apparatus 15 will be omitted from the following descriptions.

Figure 14:
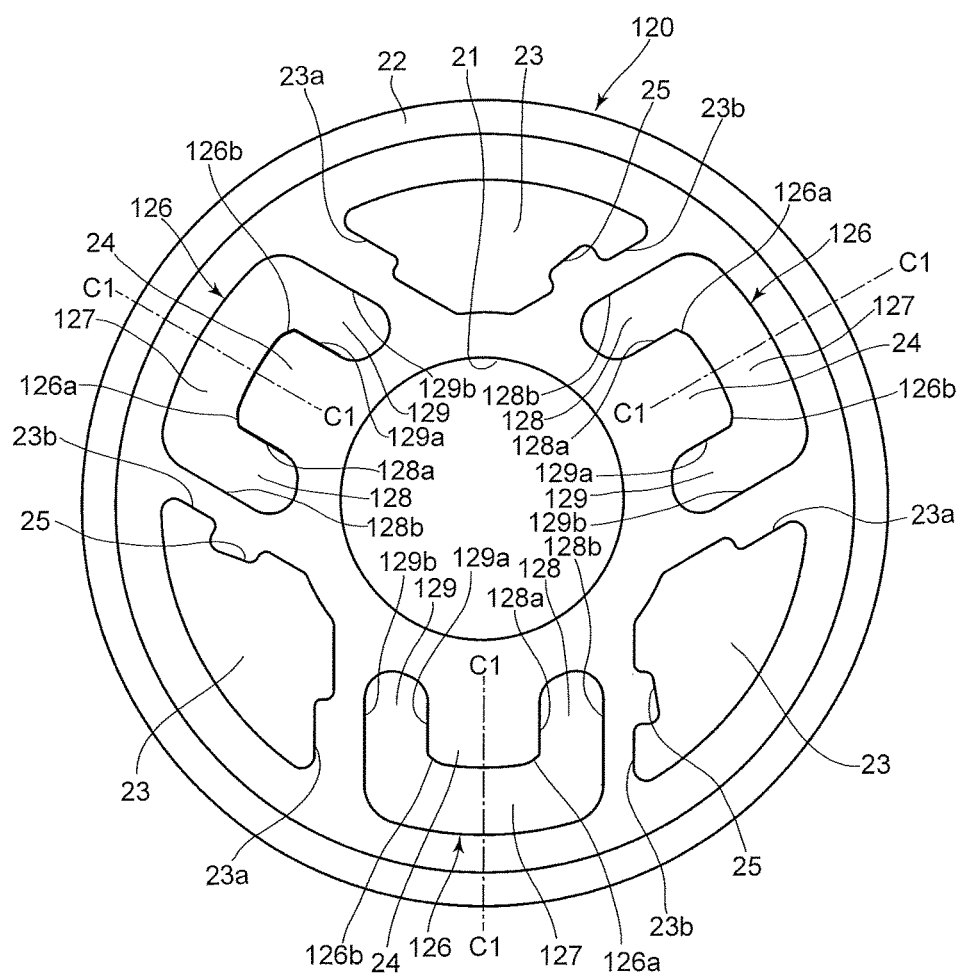
FIG. 14 is a side elevational view of a base plate which constitutes an element of a second embodiment of the seat reclining apparatus.

As shown in FIG. 14, each of the three pawl guide recesses 126 is provided with a bridging portion 127 which extends in the circumferential direction of the base plate 120 and a pair of grooves 128 and 129 which extend toward the inner peripheral side from the bridging portion 127. Each pawl guide recess 126 has a substantially symmetrical shape with respect to an associated center line C1 which passes through the circumferential center of the associated guide groove 24 and extends in a radial direction of the base plate 120. An inner side surface 128a and an outer side surface 128b which face each other in the circumferential direction of the base plate 120 are formed in the groove 128 of each pawl guide recess 126, and an inner side surface 129a and an outer side surface 129b which face each other in the circumferential direction of the base plate 120 are formed in the groove 129 of each pawl guide recess 126. Each inner side surface 128a and 129a is positioned on the near side to the associated center line C1, while each outer side surface 128b and 129b is positioned on the far side from the associated center line C1. The inner side surface 128a, the outer side surface 128b, the inner side surface 129a and the outer side surface 129b of each pawl guide recess 126 are all substantially parallel to the flat guide surfaces 23a and 23b of the associated (adjacent) groove-forming projections 23. An inclined guide surface 126a which is continuous with the outer peripheral-side end of the inner side surface 128a and an inclined guide surface 126b which is continuous with the outer peripheral-side end of the inner side surface 129a are further formed in each pawl guide recess 126. The inclined guide surface 126a is an inclined surface which is inclined toward the associated center line C1 in a direction toward the outer peripheral side (the associated bridging portion 127 side) away from inner side surface 128a, and the inclined guide surface 126b is an inclined surface which is inclined toward the associated center line C1 in a direction toward the outer peripheral side (the associated bridging portion 127 side) away from inner side surface 129a. The inclined guide surface 126a and the inclined guide surface 126b of each pawl guide recess 126 are shaped to be substantially symmetrical with respect to the associated center line C1.

Figure 15:
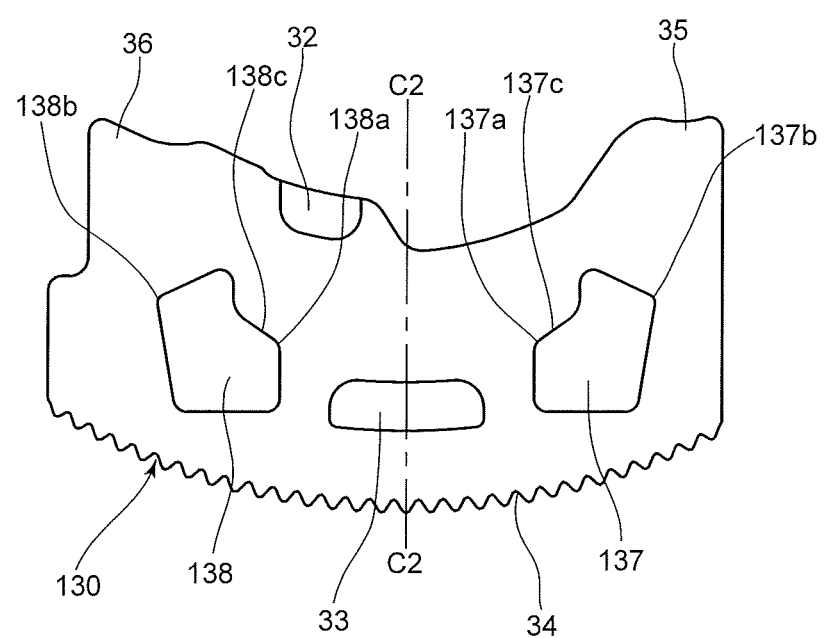
FIG. 15 is a side elevational view of one of three pawls which constitute elements of the second embodiment of the seat reclining apparatus.

As shown in FIG. 15, the guide projections 137 and 138 of each pawl 130 are shaped to be substantially symmetrical with respect to a center line C2 of the pawl 130 which passes through the circumferential center of the pawl 130 and extends in a radial direction of the base plate 120. A holding projection 33 of each pawl 130 is positioned on the center line C2 thereof, and the guide projections 137 and 138 of each pawl 130 are positioned on the opposite sides of the holding projection 33 in the circumferential direction. The guide projection 137 of each pawl 130 is provided, on the near and far sides thereof from the associated center line C2, with a corner 137a and a corner 137b, respectively, and the guide projection 138 of each pawl 130 is provided, on the near and far sides thereof from the associated center line C2, with a corner 138a and a corner 138b, respectively. In each pawl 130, the width of the guide projection 137 (the distance between the corners 137a and 137b) is smaller than the width of the associated groove 128 (the distance between the inner side surface 128a and the outer side surface 128b) in the circumferential direction, so that a clearance exists between the guide projection 137 and the associated groove 128 in the circumferential direction with the guide projection 137 positioned in the associated groove 128. Similarly, in each pawl 130, the width of the guide projection 138 (the distance between the corners 138a and 138b) is smaller than the width of the associated groove 129 (the distance between the inner side surface 129a and the outer side surface 129b) in the circumferential direction, so that a clearance exists between the guide projection 138 and the associated groove 129 in the circumferential direction with the guide projection 138 positioned in the associated groove 129. These clearances are each set to be greater than the clearance between each pawl 130 and the associated flat guide surfaces 23a and 23b. Accordingly, when each pawl 130 moves in a radial direction of the base plate 120 in a normal operating state, the guide projections 137 and 138 of each pawl 130 do not interfere with the inner surface of the associated pawl guide recess 126, thus not interfering with the operation of each pawl 130.

The guide projection 137 of each pawl 130 is further provided with an inclined guide surface 137c at a position nearer to the inner peripheral side than the corner 137a, and the guide projection 138 of each pawl 130 is further provided with an inclined guide surface 138c at a position nearer to the inner peripheral side than the corner 138a. The inclined guide surface 137c is an inclined surface which is inclined away from the associated center line C2 in a direction toward the inner peripheral side away from the corner 137a, and the inclined guide surface 138c is an inclined surface which is inclined away from the associated center line C2 in a direction toward the inner peripheral side away from the corner 138a. The inclined guide surface 137c and the inclined guide surface 138c of each pawl 130 are shaped to be substantially symmetrical with respect to the associated center line C2.

Figure 16:
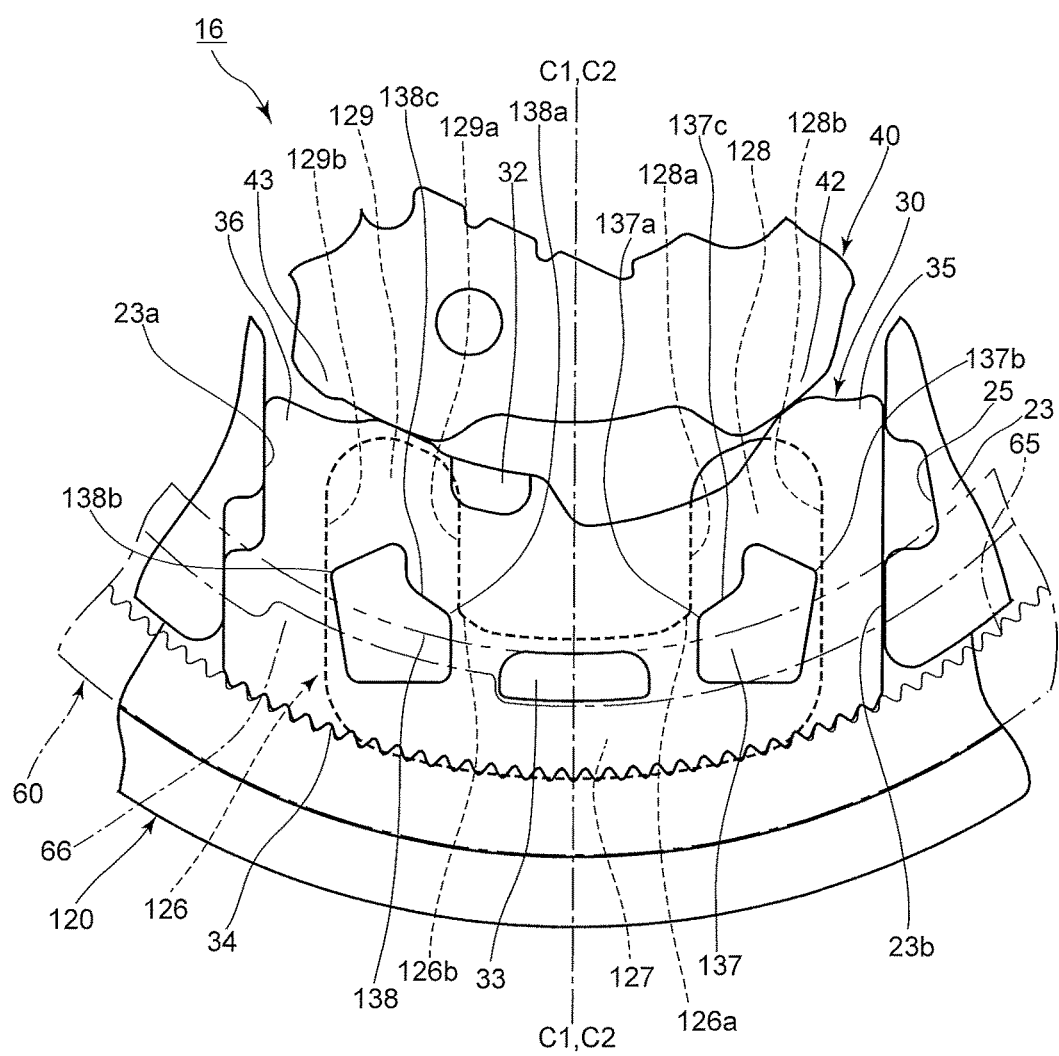
FIG. 16 is a side elevational view of a portion of the second embodiment of the seat reclining apparatus in a locked state.

When the seat reclining apparatus 16 is in a locked state, the pair of guide projections 137 and 138 of each pawl 130 are located relative to the associated pawl guide recess 126 at the positions shown in FIG. 16. In this state, the corner 137b faces the outer side surface 128b of the associated groove 128, the corner 138b faces the outer side surface 129b of the associated groove 129, and the corners 137a and 138a are positioned slightly closer to the outer peripheral side (the bridging portion 127 side) than the inner side surfaces 128a and 129a, respectively.

Figure 17:
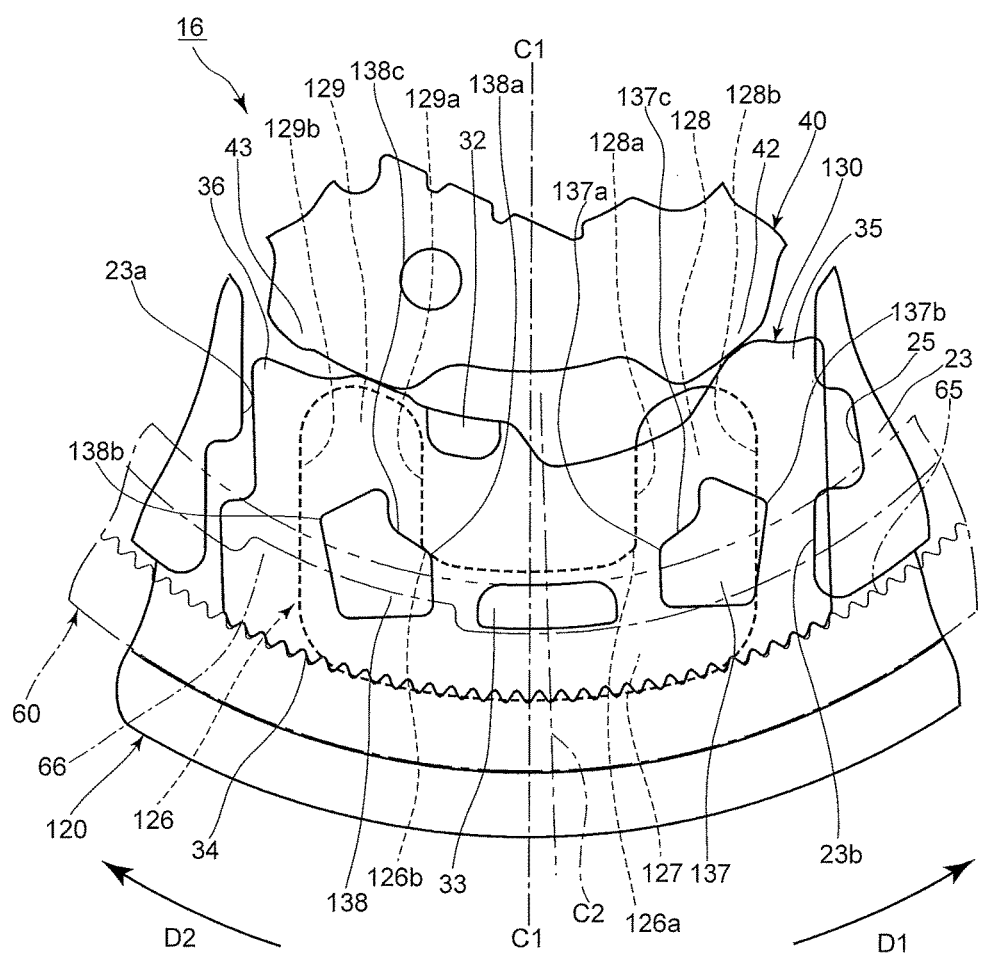
FIG. 17 is a side elevational view of a portion of the second embodiment of the seat reclining apparatus in the vicinity of one of the three pawls in a state where this pawl has moved circumferentially.

FIG. 17 shows the case where an excessive load in a direction D1 shown in FIG. 17 is exerted on one pawl 130 when the seat reclining apparatus 16 is in a locked state (shown in FIG. 16). In this case, the center line C2 is inclined in the direction D1 by a movement (or deformation) of the pawl 130 in the circumferential direction due to the excessive load in the direction D1. In accordance with this positional variation of the pawl 130 due to the excessive load, the inclined guide surface 138c of the guide projection 138 and the inclined guide surface 126b of the pawl guide recess 126 are in contact with each other. The inclined guide surface 138c of the guide projection 138 of the pawl 130 and the inclined guide surface 126b of the associated pawl guide recess 126 are surfaces which create a component of force that presses the associated pawl 130 toward the outer peripheral side against the load in the direction D1, and this component of force causes a force acting on the pawl 130 to press the outer toothed portion 34 thereof against the internal gear 65 of the ratchet plate 60. This force against the internal gear 65 strongly acts especially on a portion of the pawl 130 in the circumferential direction on which the guide projection 138 is formed (i.e., a portion of the pawl 130 which is closer to the front in the direction D2 than the center line C2). As a result, in a locked state of the seatback 12 with respect to the seat cushion 11, even when an extremely large force in a tilting (rotating) direction which may tilt or deform the pawl(s) 130 is exerted on the seat reclining apparatus 16 (even when a force in a direction different from the directions in which the pawls 130 are guided by the guide grooves 24 is exerted on the pawls 130) with the seatback 12 locked with respect to the seat cushion 11, the engagement between the outer toothed portion 34 of each pawl 130 and the internal gear 65 of the ratchet plate 60 can be reliably maintained, which makes it possible to achieve high safety. In the condition shown in FIG. 17, the restrictor portion 42 of the rotational cam 40 and the restricted portion 35 of the associated pawl 130 are already in contact with each other before the inclined guide surface 138c of the guide projection 138 of the pawl 130 and the inclined guide surface 126b of the pawl guide recess 126 of the base plate 120 come in contact with each other.

Although not shown in the drawings, in the case where each pawl 130 is acted upon by an excessive load in a direction D2 (shown in FIG. 17) which is opposite to the direction D1 when the seat reclining apparatus 16 is in a locked state, the inclined guide surface 137c of the guide projection 137 of each pawl 130 comes into contact with and presses the inclined guide surface 126a of the associated pawl guide recess 126 to thereby create a component of force that presses the pawl 130 toward the outer peripheral side against the load in the direction D2. This component of force causes a force acting on the pawl 130 to press the outer toothed portion 34 thereof against the internal gear 65 of the ratchet plate 60, which makes it possible to maintain the engagement between the outer toothed portion 34 of each pawl 130 and the internal gear 65 of the ratchet plate 60 with reliability.

In addition, each pawl 130 can be prevented from tilting or becoming deformed more than that shown in FIG. 17 by engagement of portions of the guide projections 137 and 138 of each pawl 130 except the inclined guide surfaces 137c and 138c with the inner surface of the associated pawl guide recess 126.

A third embodiment of the seat reclining apparatus 17 according to the present invention will be hereinafter discussed with reference to FIGS. 18 through 21. In the third embodiment of the seat reclining apparatus 17, a pair of guide projections (elements of a meshed-state retainer/engaged portions/protrusions) 237 and 238 of each pawl (lock member) 230 are inserted into associated one of three pawl guide recesses (elements of the meshed-state retainer/engaging portion/depression) 226 formed on a base plate (base member) 220. The third embodiment of the seat reclining apparatus 17 is the same as the first embodiment of the seat reclining apparatus 15 except that each pawl guide recess 226 of the base plate 220 and the pair of guide projections 237 and 238 of each pawl 230 are different in shape from each pawl guide recess 26 of the base plate 20 and the pair of guide projections 37 and 38 of each pawl 30 of the first embodiment of the seat reclining apparatus 15. The descriptions about portions of the third embodiment of the seat reclining apparatus 17 which are the same as those of the first embodiment of the seat reclining apparatus 15 will be omitted from the following descriptions.

Figure 18:
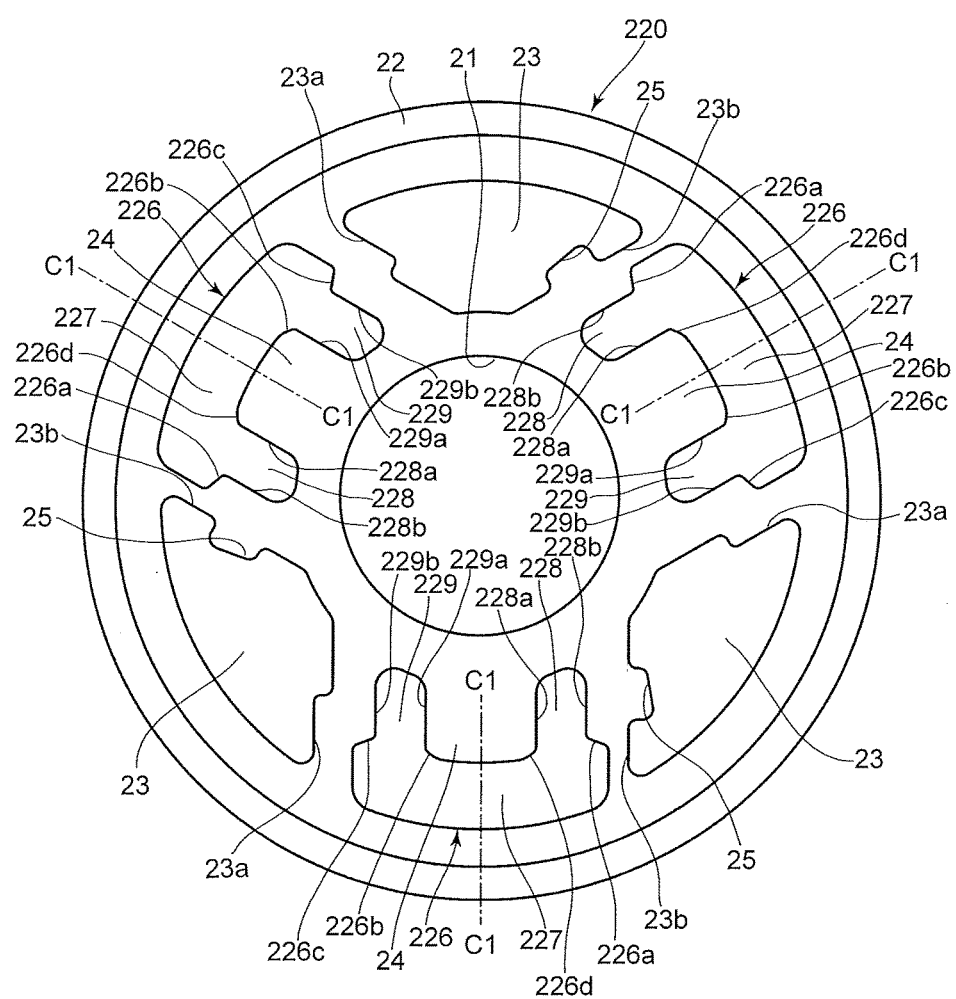
FIG. 18 is a side elevational view of abase plate which constitutes an element of a third embodiment of the seat reclining apparatus.

As shown in FIG. 18, each of the three pawl guide recesses 226 is provided with a bridging portion 227 which extends in the circumferential direction of the base plate 220 and a pair of grooves 228 and 229 which extend toward the inner peripheral side from the bridging portion 227. Each pawl guide recess 226 has a substantially symmetrical shape with respect to an associated center line C1 which passes through the circumferential center of the associated guide groove 24 and extends in a radial direction of the base plate 220. An inner side surface 228a and an outer side surface 228b which face each other in the circumferential direction of the base plate 220 are formed in the groove 228 of each pawl guide recess 226, and an inner side surface 229a and an outer side surface 229b which face each other in the circumferential direction of the base plate 220 are formed in the groove 229 of each pawl guide recess 226. Each inner side surface 228a and 229a is positioned on the near side to the associated center line C1, while each outer side surface 228b and 229b is positioned on the far side from the associated center line C1. The inner side surface 228a, the outer side surface 228b, the inner side surface 229a and the outer side surface 229b of each pawl guide recess 226 are all substantially parallel to the flat guide surfaces 23a and 23b of the associated (adjacent) groove-forming projections 23.

Four inclined guide surfaces 226a, 226b, 226c and 226d are further formed in each pawl guide recess 226. The inclined guide surface 226a is formed to be continuous with the outer peripheral-side end of the outer side surface 228b. The inclined guide surface 226b is formed to be continuous with the outer peripheral-side end of the inner side surface 229a. The inclined guide surface 226c is formed to be continuous with the outer peripheral-side end of the outer side surface 229b. The inclined guide surface 226d is formed to be continuous with the outer peripheral-side end of the inner side surface 228a. The inclined guide surface 226a is an inclined surface which is inclined away from the associated center line C1 in a direction toward the outer peripheral side (toward the associated bridging portion 227) away from the outer side surface 228b, and the inclined guide surface 226b is an inclined surface which is inclined toward the associated center line C1 in a direction toward the outer peripheral side (toward the associated bridging portion 227) away from the inner side surface 229a. The inclined guide surface 226c is an inclined surface which is inclined away from the associated center line C1 in a direction toward the outer peripheral side (toward the associated bridging portion 227) away from the outer side surface 229b, and the inclined guide surface 226d is an inclined surface which is inclined toward the associated center line C1 in a direction toward the outer peripheral side (toward the associated bridging portion 227) away from the inner side surface 228a. The inclined guide surface 226a and the inclined guide surface 226c of each pawl guide recess 226 are shaped to be substantially symmetrical with respect to the associated center line C1, and the inclined guide surface 226b and the inclined guide surface 226d of each pawl guide recess 226 are shaped to be substantially symmetrical with respect to the associated center line C1.

Figure 19:
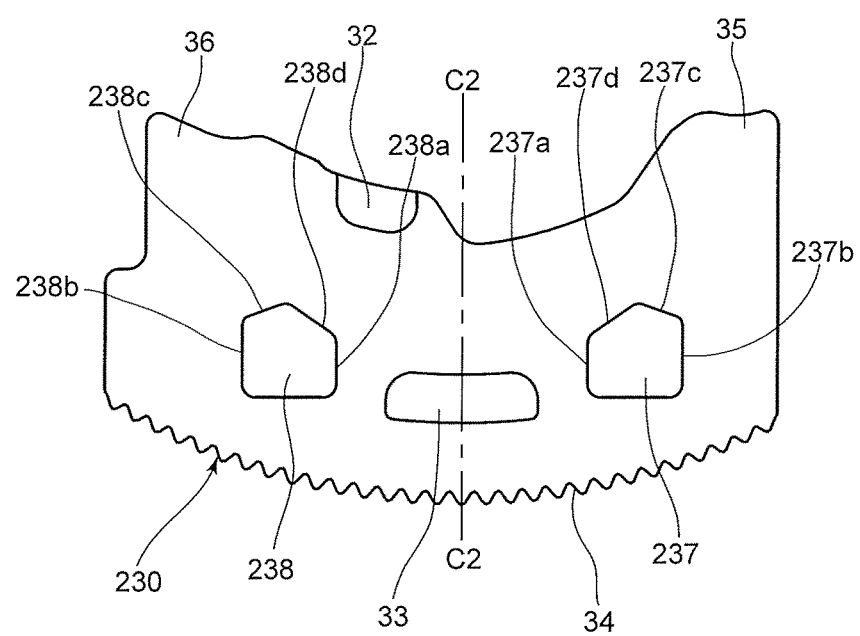
FIG. 19 is a side elevational view of one of three pawls which constitute elements of the third embodiment of the seat reclining apparatus.

As shown in FIG. 19, the guide projections 237 and 238 of each pawl 230 are shaped to be substantially symmetrical with respect to a center line C2 of the pawl 230 which passes through the circumferential center of the pawl 230 and extends in a radial direction of the base plate 220. A holding projection 33 of each pawl 230 sits on the center line C2 thereof, and the guide projections 237 and 238 of each pawl 230 are positioned on the opposite sides of the holding projection 33 in the circumferential direction. The guide projection 237 of each pawl 230 is provided, on the near and far sides thereof from the associated center line C2, with an inner side surface 237a and an outer side surface 237b, respectively, and the guide projection 238 of each pawl 230 is provided, on the near and far sides thereof from the associated center line C2, with an inner side surface 238a and an outer side surface 238b, respectively. The inner side surface 237a and the outer side surface 237b of the guide projection 237 and the inner side surface 238a and the outer side surface 238b of the guide projection 238 of each pawl 230 are all substantially parallel to the flat guide surfaces 23a and 23b of the associated (adjacent) groove-forming projections 23. In each pawl 230, the width of the guide projection 237 (the distance between the inner side surface 237a and the outer side surface 237b) is smaller than the width of the associated groove 228 (the distance between the inner side surface 228a and the outer side surface 228b) in the circumferential direction, so that a clearance exists between the guide projection 237 and the associated groove 228 in the circumferential direction with the guide projection 237 positioned in the associated groove 228. Similarly, in each pawl 230, the width of the guide projection 238 (the distance between the inner side surface 238a and the outer side surface 238b) is smaller than the width of the associated groove 229 (the distance between the inner side surface 229a and the outer side surface 229b) in the circumferential direction, so that a clearance exists between the guide projection 238 and the associated groove 229 in the circumferential direction with the guide projection 238 positioned in the associated groove 229. These clearances are each set to be greater than the clearance between each pawl 230 and the associated flat guide surfaces 23a and 23b. Accordingly, when each pawl 230 moves in a radial direction of the base plate 220 in a normal operating state, the guide projections 237 and 238 of each pawl 230 do not interfere with the inner surface of the associated pawl guide recess 226, thus not interfering with the operation of each pawl 230.

The guide projection 237 of each pawl 230 is further provided with an inclined guide surface 237c and an inclined guide surface 237d. The inclined guide surface 237c is formed to be continuous with the inner peripheral-side end of the outer side surface 237b, and the inclined guide surface 237d is formed to be continuous with the inner peripheral-side end of the inner side surface 237a. The inclined guide surface 237c is an inclined surface which is inclined toward the associated center line C2 in a direction toward the inner peripheral side away from the outer side surface 237b, and the inclined guide surface 237d is an inclined surface which is inclined away from the associated center line C2 in a direction toward the inner peripheral side away from the inner side surface 237a. The guide projection 238 of each pawl 230 is further provided with an inclined guide surface 238c and an inclined guide surface 238d. The inclined guide surface 238c is formed to be continuous with the inner peripheral-side end of the outer side surface 238b, and the inclined guide surface 238d is formed to be continuous with the inner peripheral-side end of the inner side surface 238a. The inclined guide surface 238c is an inclined surface which is inclined toward the associated center line C2 in a direction toward the inner peripheral side away from the outer side surface 238b, and the inclined guide surface 238d is an inclined surface which is inclined away from the associated center line C2 in a direction toward the inner peripheral side away from the inner side surface 238a. The inclined guide surface 237c and the inclined guide surface 238c of each pawl 230 are shaped to be substantially symmetrical with respect to the associated center line C2, and the inclined guide surface 237d and the inclined guide surface 238d of each pawl 230 are shaped to be substantially symmetrical with respect to the associated center line C2.

Figure 20:
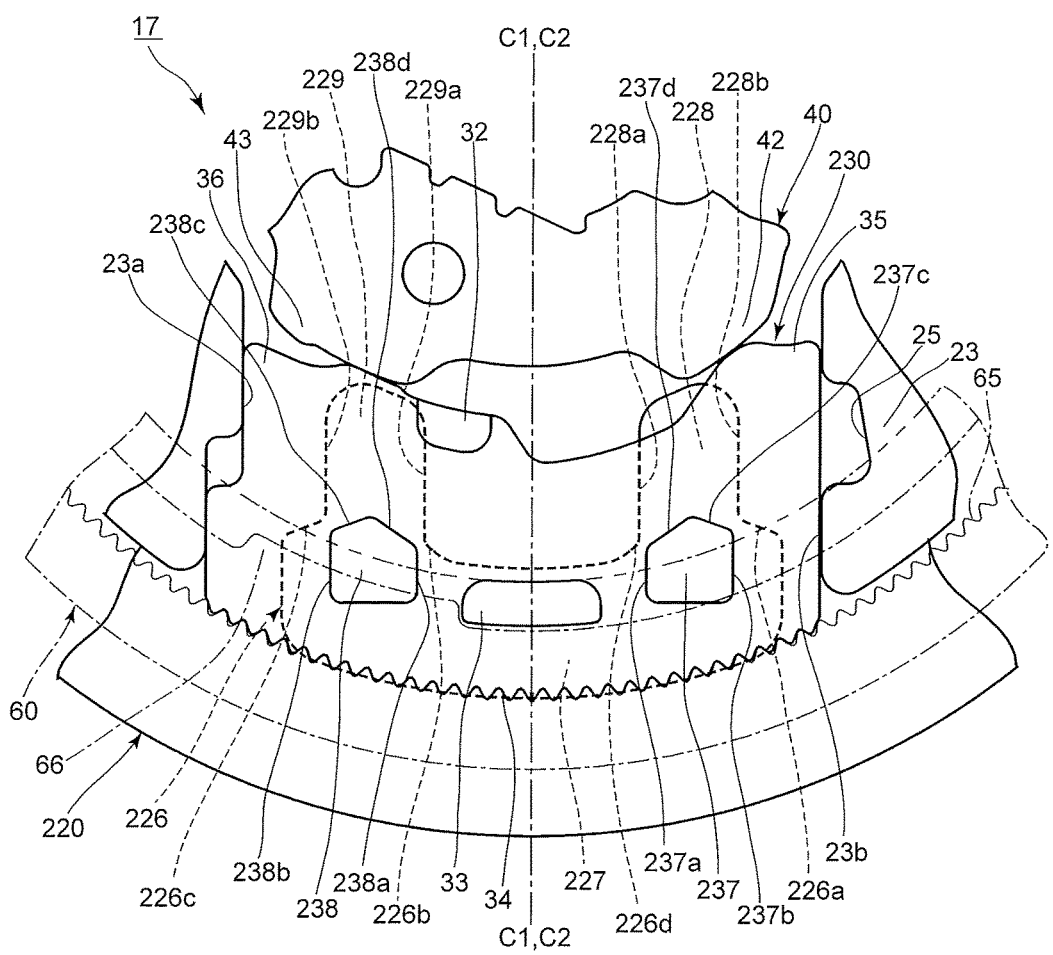
FIG. 20 is a side elevational view of a portion of the third embodiment of the seat reclining apparatus in a locked state.

When the seat reclining apparatus 17 is in a locked state, the pair of guide projections 237 and 238 of each pawl 230 are located relative to the associated pawl guide recess 226 at the positions shown in FIG. 20. In this state, the inclined guide surface 237c and the inclined guide surface 237d of the guide projection 237 of each pawl 230 are positioned in the vicinity of the inclined guide surface 226a and the inclined guide surface 226d of the associated pawl guide recess 226, respectively, and the inclined guide surface 238c and the inclined guide surface 238d of the guide projection 238 of each pawl 230 are positioned in the vicinity of the inclined guide surface 226c and the inclined guide surface 226b of the associated pawl guide recess 226, respectively.

Figure 21:
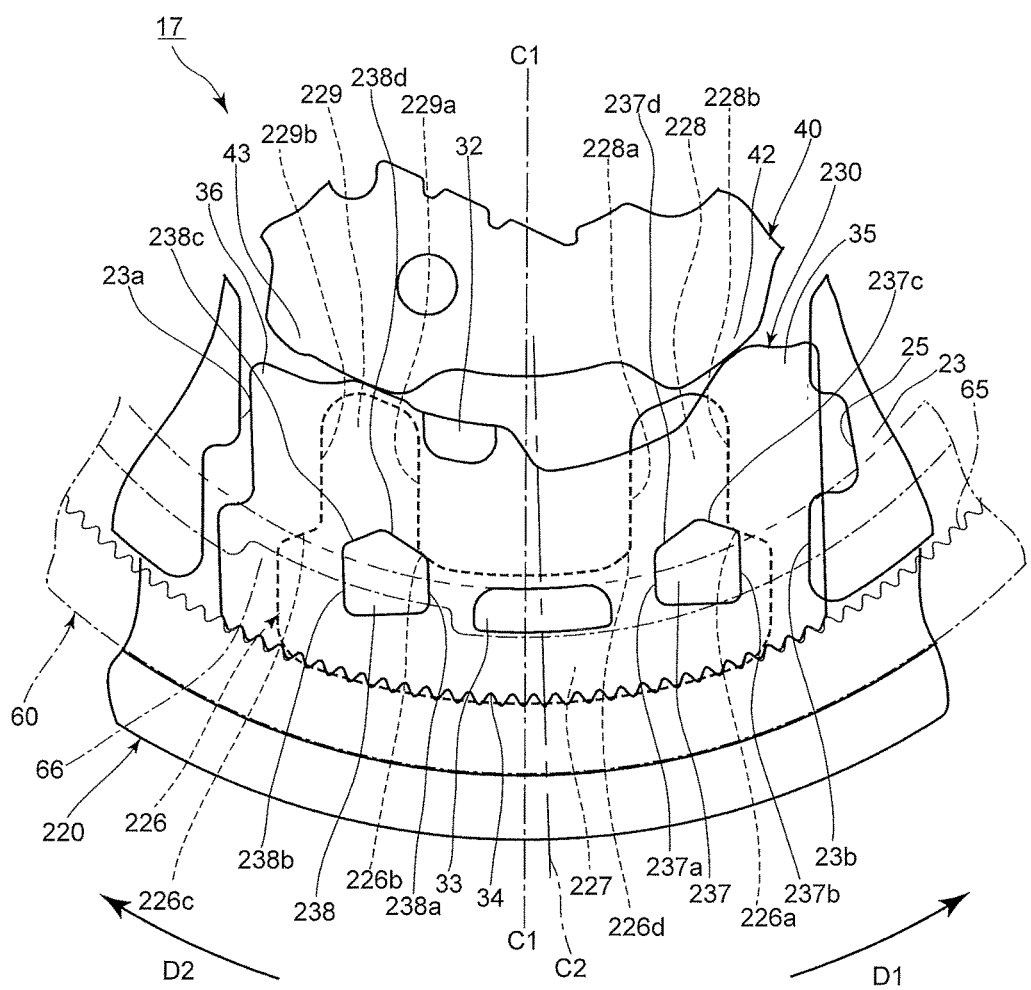
FIG. 21 is a side elevational view of a portion of the third embodiment of the seat reclining apparatus in the vicinity of one of the three pawls in a state where this pawl has moved circumferentially.

FIG. 21 shows the case where an excessive load in a direction D1 shown in FIG. 21 is exerted on one pawl 230 when the seat reclining apparatus 17 is in a locked state (shown in FIG. 20). In such a case, the center line C2 is inclined in the direction D1 by a movement (or deformation) of the pawl 230 in the circumferential direction due to the excessive load in the direction D1. In accordance with this positional variation of the pawl 230 due to the excessive load, the inclined guide surface 237c of the guide projection 237 and the inclined guide surface 226a of the pawl guide recess 226 are in contact with each other, while the inclined guide surface 238d of the guide projection 238 and the inclined guide surface 226b of the pawl guide recess 226 are in contact with each other. The inclined guide surface 237c and the inclined guide surface 226a, and the inclined guide surface 238d and the inclined guide surface 226b are surfaces which create a component of force that presses the associated pawl 230 toward the outer peripheral side against the load in the direction D1, and this component of force causes a force acting on the pawl 230 to press the outer toothed portion 34 thereof against the internal gear 65 of the ratchet plate 60. As a result, in a locked state of the seatback 12 with respect to the seat cushion 11, even when an extremely large force in a tilting (rotating) direction which may tilt or deform the pawl(s) 230 is exerted on the seat reclining apparatus 17 (even when a force in a direction different from the directions in which the pawls 230 are guided by the guide grooves 24 is exerted on the pawls 230) with the seatback 12 locked with respect to the seat cushion 11, the engagement between the outer toothed portion 34 of each pawl 230 and the internal gear 65 of the ratchet plate 60 can be reliably maintained, which makes it possible to achieve a high level of safety. In the condition shown in FIG. 21, the restrictor portion 42 of the rotational cam 40 and the restricted portion 35 of the associated pawl 230 are already in contact with each other before the inclined guide surfaces 237c and 238d of the guide projections 237 and 238 of the pawl 230 and the inclined guide surfaces 226a and 226b of the pawl guide recess 226 of the base plate 220 come in contact with each other.

Although not shown in the drawings, in the case where each pawl 230 is acted upon by an excessive load in a direction D2 (shown in FIG. 21) which is opposite to the direction D1 when the seat reclining apparatus 17 is in a locked state, the inclined guide surface 238c of the guide projection 238 of each pawl 230 comes into contact with and presses the inclined guide surface 226c of the associated pawl guide recess 226, and the inclined guide surface 237d of the guide projection 237 of each pawl 230 comes into contact with and presses the inclined guide surface 226d of the associated pawl guide recess 226. The inclined guide surface 238c and the inclined guide surface 226c, and the inclined guide surface 237d and the inclined guide surface 226d are surfaces which create a component of force that presses the associated pawl 230 toward the outer peripheral side against the load in the direction D2. This component of force causes a force acting on the pawl 230 to press the outer toothed portion 34 thereof against the internal gear 65 of the ratchet plate 60, which makes it possible to reliably maintain the engagement between the outer toothed portion 34 of each pawl 230 and the internal gear 65 of the ratchet plate 60.

In the third embodiment of the seat reclining apparatus 17, even when an excessive load in either of the directions D1 and D2 shown in FIG. 21 is exerted on the pawls 230, the guide projections 237 and 238 of each pawl 230 come into contact with and presses the inclined guide surfaces (226a/226b/226c/226d) of the associated pawl guide recess 226 on both sides of the center line C2 of the pawl 230 in the circumferential direction to thereby create a component of force that presses the pawl 230 toward the outer peripheral side, which makes it possible to reliably maintain the engagement between the outer toothed portion 34 of each pawl 230 and the internal gear 65 of the ratchet plate 60 over the entire range of the pawl 230.

In addition, each pawl 230 can be prevented from tilting or becoming deformed more than that shown in FIG. 21 by engagement of portions of the guide projections 237 and 238 of each pawl 230 except the inclined guide surfaces 237c, 237d, 238c and 238d with the inner surface of the associated pawl guide recess 226.

A fourth embodiment of the seat reclining apparatus 18 according to the present invention will be hereinafter discussed with reference to FIGS. 22 through 25. In each of the above illustrated first through third embodiments, the pawl guide recesses 26, 126 or 226 are provided as engaging portions on the base plate 20, 120 or 220, while the guide projections 37 and 38, 137 and 138, or 237 and 238 are provided as engaged portions on each pawl 30, 130 or 230. In the fourth embodiment of the seat reclining apparatus 18, this projection-depression relationship between each engaging portion and the associated engaged portion is reversed. Namely, three pairs of pawl guide projections (elements of a meshed-state retainer/engaged portions/protrusions) 326 and 327 are provided on a base plate (base member) 320, while a pair of guide holes (elements of the meshed-state retainer/engaged portions/depressions/holes) 337 and 338 are formed in each pawl (lock member) 330. The fourth embodiment of the seat reclining apparatus 18 is identical in structure to the first embodiment of the seat reclining apparatus 15 except the structure of the base plate 320 and the pawls 330, and the descriptions about portions of the fourth embodiment of the seat reclining apparatus 18 which are the same as those of the first embodiment of the seat reclining apparatus 15 will be omitted from the following descriptions.

Figure 22:
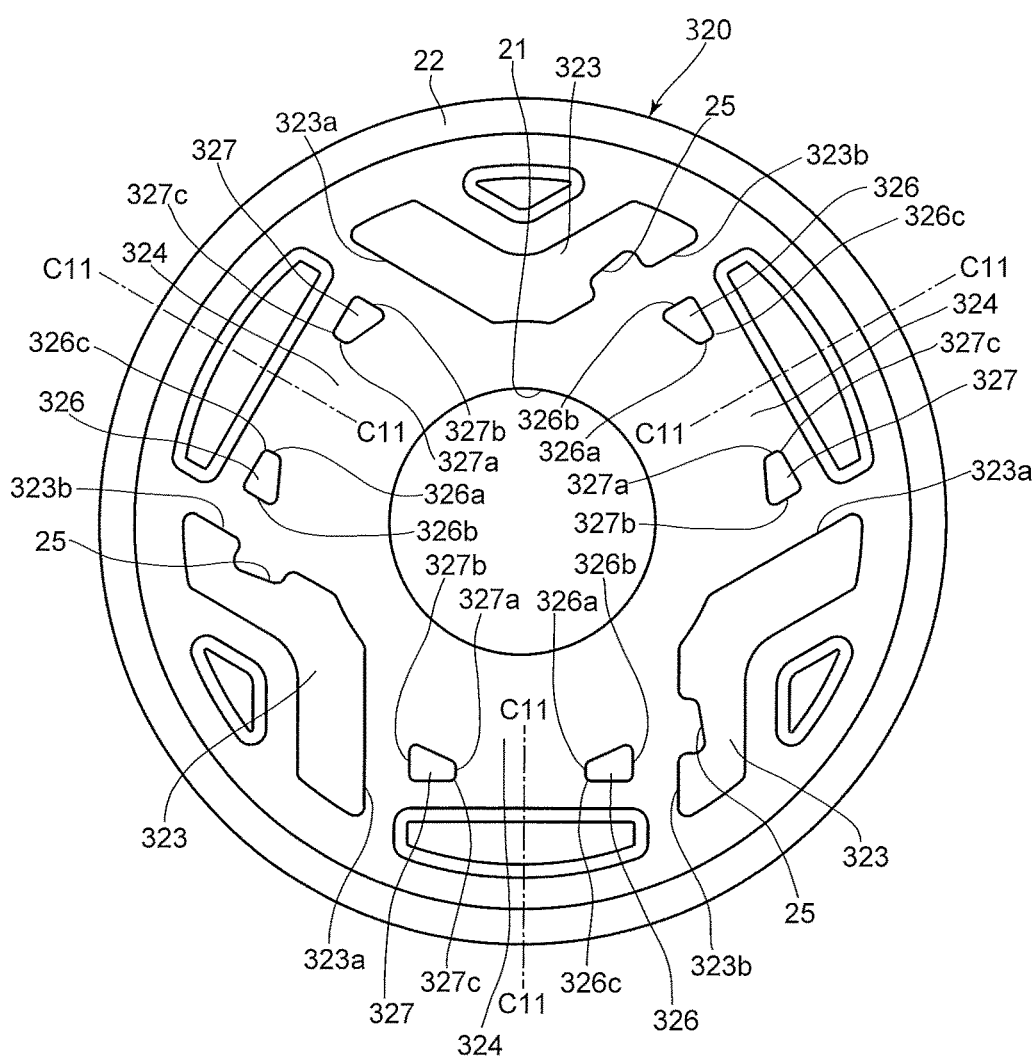
FIG. 22 is a side elevational view of a base plate which constitutes an element of a fourth embodiment of the seat reclining apparatus.

As shown in FIG. 22, the base plate 320 is provided, at substantially equi-angular intervals in the circumferential direction, with three groove-forming projections 323, and provided, on both sides of each groove-forming projection 323 in the circumferential direction, with two flat guide surfaces 323a and 323b. A guide groove 324 which extends in a radial direction of the base plate 320 is formed between any two of the flat guide surfaces 323a and 323b which face each other in the circumferential direction. Namely, the base plate 320 is provided, between the three groove-forming projections 323 at substantially equi-angular intervals (at intervals of approximately 120 degrees) in the circumferential direction, with three guide grooves 324. The base plate 320 is provided on the base of each guide groove 324 with a pair of pawl guide projections 326 and 327 which are positioned at either side of an associated center line C11 which passes through the circumferential center of the guide groove 324 and extends in a radial direction of the base plate 320. Each pair of pawl guide projections 326 and 327 are substantially symmetrical in shape with respect to the associated center line C11 that is positioned therebetween. The pawl guide projection 326 is provided on the near side to the center line C11 with an inner side surface 326a and provided on the far side from the center line C11 with an outer side surface 326b, and the pawl guide projection 327 is provided on the near side to the center line C11 with an inner side surface 327a and provided on the far side from the center line C11 with an outer side surface 327b. The inner side surface 326a and the outer side surface 326b of the pawl guide projection 326 and the inner side surface 327a and the outer side surface 327b of the pawl guide projection 327 in each guide groove 324 are all substantially parallel to the flat guide surfaces 323a and 323b of the associated (adjacent) groove-forming projections 323.

The pawl guide projection 326 is further provided with an inclined guide surface 326c and the pawl guide projection 327 is further provided with an inclined guide surface 327c. The inclined guide surface 326c is formed to be continuous with the outer peripheral-side end of the outer side surface 326a, and the inclined guide surface 327c is formed to be continuous with the outer peripheral-side end of the outer side surface 327a. The inclined guide surface 326c is an inclined surface which is inclined away from the associated center line C11 in a direction toward the outer peripheral side away from the outer side surface 326a, and the inclined guide surface 327c is an inclined surface which is inclined away from the associated center line C11 in a direction toward the outer peripheral side away from the outer side surface 327a. The inclined guide surface 326c and the inclined guide surface 327c of each pair of pawl guide projections 326 and 327 are shaped to be substantially symmetrical with respect to the associated center line C11.

Figure 23:
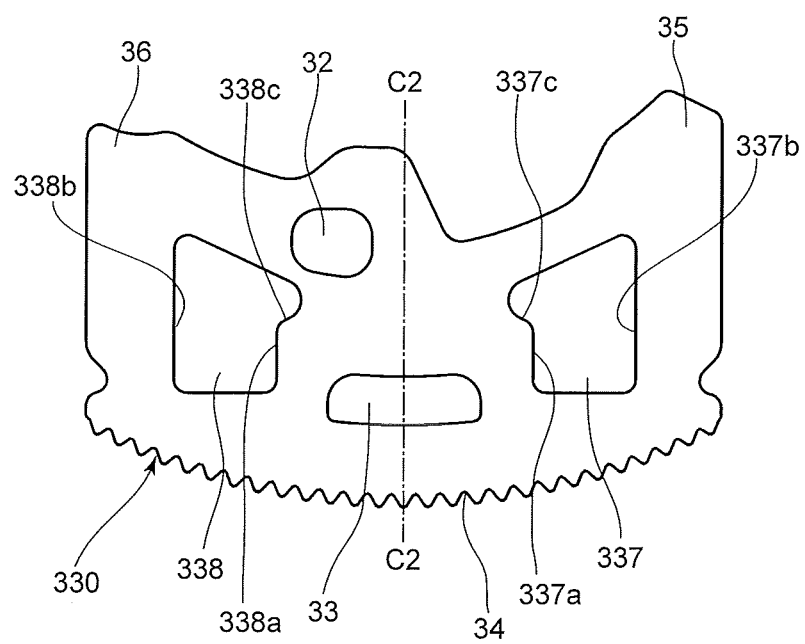
FIG. 23 is aside elevational view of one of three pawls which constitute elements of the fourth embodiment of the seat reclining apparatus.

As shown in FIG. 23, the pair of guide holes 337 and 338 of each pawl 330 are formed therethrough in the thickness direction of the pawl 330. The pair of guide holes 337 and 338 of each pawl 330 are shaped to be substantially symmetrical with respect to a center line C2 of the pawl 330 which passes through the circumferential center of the pawl 330 and extends in a radial direction of the base plate 320. A holding projection 33 of each pawl 330 is positioned on the center line C2 thereof, and the pair of guide holes 337 and 338 of each pawl 330 are positioned on the opposite sides of the holding projection 33 in the circumferential direction. The guide hole 337 of each pawl 330 is provided with an inner side surface 337a and an outer side surface 337b, respectively, which face each other in the circumferential direction, and the guide hole 338 of each pawl 330 is provided with an inner side surface 338a and an outer side surface 338b, respectively, which face each other in the circumferential direction. Each of the inner side surfaces 337a and 338a is positioned on the near side to the center line C2, while each of the inner side surfaces 337b and 338b is positioned on the far side from the center line C2. The inner side surface 337a and the outer side surface 337b of the guide hole 337 and the inner side surface 338a and the outer side surface 338b of the guide hole 338 are all substantially parallel to the flat guide surfaces 323a and 323b of the associated (adjacent) groove-forming projections 323. An inclined guide surface 337c and an inclined guide surface 338c are further formed in the guide holes 337 and 338 of each pawl 330. The inclined guide surface 337c is formed to be continuous with the inner peripheral-side end of the inner side surface 337a, and the inclined guide surface 338a is formed to be continuous with the inner peripheral-side end of the inner side surface 338a. The inclined guide surface 337c is an inclined surface which is inclined toward the associated center line C2 in a direction toward the inner peripheral side away from the inner side surface 337a, and the inclined guide surface 338c is an inclined surface which is inclined toward the associated center line C2 in a direction toward the inner peripheral side away from the inner side surface 338a. The inclined guide surface 337c and the inclined guide surface 338c of the guide holes 337 and 338 of each pawl 330 are shaped to be substantially symmetrical with respect to the associated center line C2.

Figure 24:
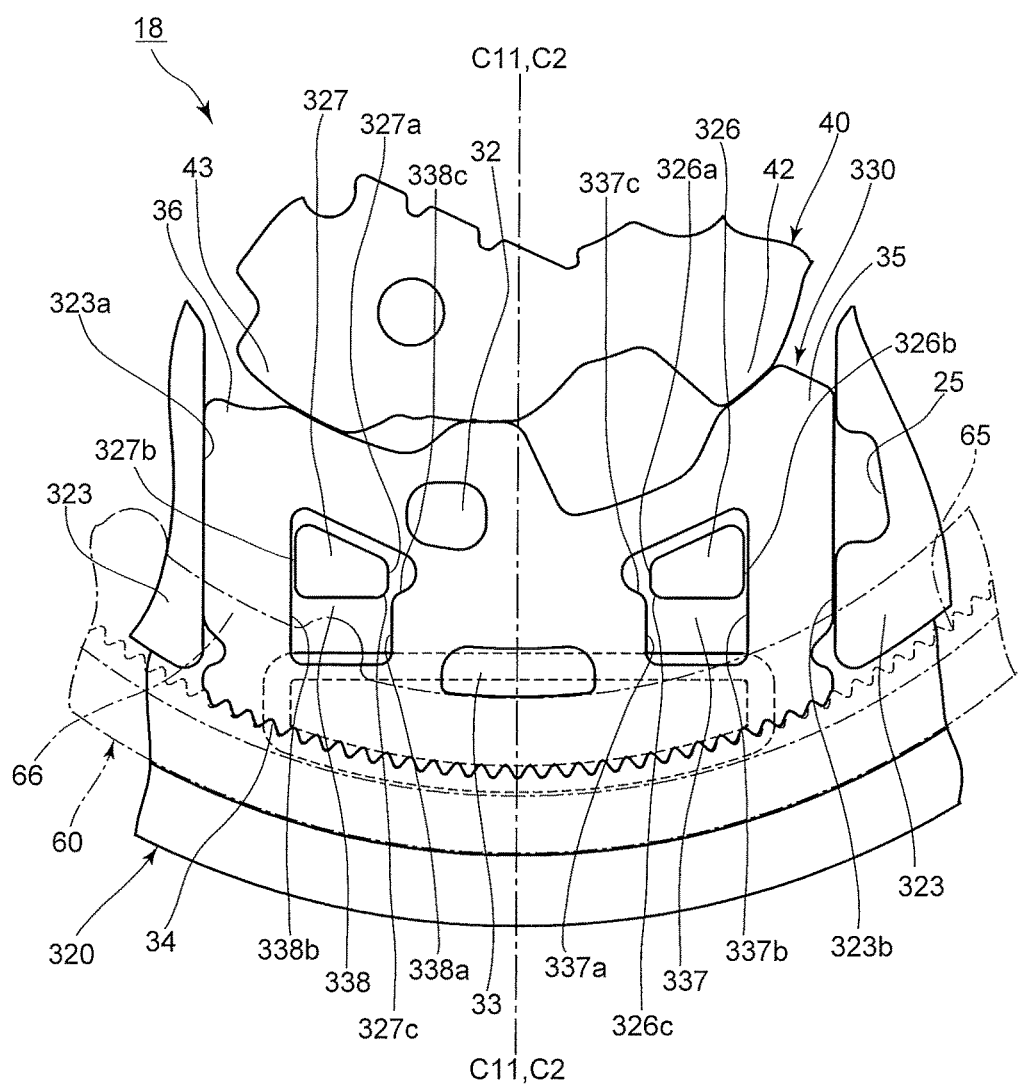
FIG. 24 is a side elevational view of a portion of the fourth embodiment of the seat reclining apparatus in a locked state.

As shown in FIG. 24, each pair of pawl guide projections 326 and 327 are inserted into the pair of guide holes 337 and 338 of the associated pawl 330 with each pawl 330 supported in the associated guide groove 324. The width of each pawl guide projection 326 (the distance between the inner side surface 326a and the outer side surface 326b of each pawl guide projection 326) is smaller than the width of the associated guide hole 337 (the distance between the inner side surface 337a and the outer side surface 337b of the associated guide hole 337) in the circumferential direction, so that a clearance exists between each pawl guide projection 326 and the associated guide hole 337 in the circumferential direction. The width of each pawl guide projection 327 (the distance between the inner side surface 327a and the outer side surface 327b of each pawl guide projection 327) is smaller than the width of the associated guide hole 338 (the distance between the inner side surface 338a and the outer side surface 338b of the associated guide hole 338) in the circumferential direction, so that a clearance exists between each pawl guide projection 327 and the associated guide hole 338 in the circumferential direction. These clearances are each set to be greater than the clearance between each pawl 330 and the associated flat guide surfaces 323a and 323b. Accordingly, when each pawl 330 moves in a radial direction of the base plate 320 in a normal operating state, each pair of pawl guide projections 326 and 327 do not interfere with the inner surfaces of the associated pair of guide holes 337 and 338, thus not interfering with the operation of each pawl 330.

When the seat reclining apparatus 18 is in a locked state, each pair of pawl guide projections 326 and 327 are located relative to the associated pair of guide holes 337 and 338 at the positions shown in FIG. 24. In this state, the inclined guide surface 326c of each pawl guide projection 326 is positioned in the vicinity of the inclined guide surface 337c of the associated guide hole 337, and the inclined guide surface 327c of each pawl guide projection 327 is positioned in the vicinity of the inclined guide surface 338c of the associated guide hole 338.

Figure 25:
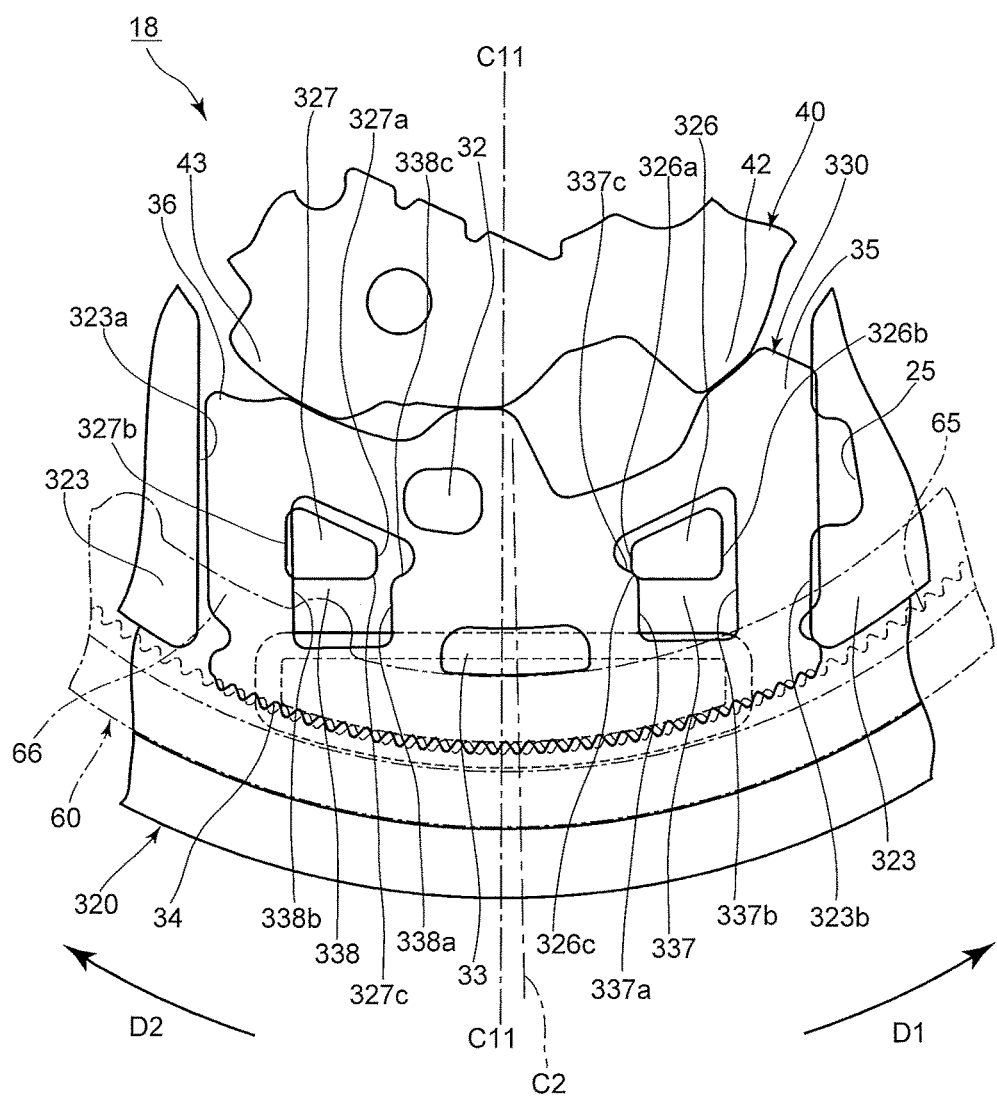
FIG. 25 is a side elevational view of a portion of the fourth embodiment of the seat reclining apparatus in the vicinity of one of the three pawls in a state where this pawl has moved circumferentially.

FIG. 25 shows the case where an excessive load in a direction D1 shown in FIG. 25 is exerted on one pawl 330 when the seat reclining apparatus 18 is in a locked state (shown in FIG. 24). In such a case, the center line C2 is inclined in the direction D1 by a movement (or deformation) of the pawl 330 in the circumferential direction due to the excessive load in the direction D1. In accordance with this positional variation of the pawl 330 due to the excessive load, the inclined guide surface 326c of the guide projection 326 and the inclined guide surface 337c of the guide hole 337 are in contact with each other. The inclined guide surface 326c of the guide projection 326 and the inclined guide surface 337c of the guide hole 337 are surfaces which create a component of force that presses the associated pawl 330 toward the outer peripheral side against the load in the direction D1, and this component of force causes a force acting on the pawl 330 to press the outer toothed portion 34 thereof against the internal gear 65 of the ratchet plate 60. The pressing force against the internal gear 65 of the ratchet plate 60 strongly acts especially on a portion of the pawl 330 in the circumferential direction in which the guide hole 337 is formed (a portion of the pawl 330 on the direction D1 side). As a result, in a locked state of the seatback 12 with respect to the seat cushion 11, even when an extremely great force in a tilting direction which may tilt or deform the pawl(s) 330 is exerted on the seat reclining apparatus 18 (even when a force in a direction different from the directions in which the pawls 330 are guided by the guide grooves 324 is exerted on the pawls 330) with the seatback 12 locked with respect to the seat cushion 11, the engagement between the outer toothed portion 34 of each pawl 330 and the internal gear 65 of the ratchet plate 60 can be reliably maintained, which makes it possible to achieve a high level of safety. In the condition shown in FIG. 25, the restrictor portion 42 of the rotational cam 40 and the restricted portion 35 of the associated pawl 330 are already in contact with each other before the inclined guide surface 326c of the guide projection 326 of the pawl 330 and the inclined guide surface 337c of the guide hole 337 of the base plate 320 come in contact with each other.

Although not shown in the drawings, in the case where each pawl 330 is acted upon by an excessive load in a direction D2 (shown in FIG. 25) which is opposite to the direction D1 when the seat reclining apparatus 18 is in a locked state, the inclined guide surface 327c of the pawl guide projection 327 of each pawl 330 comes into contact with and presses the inclined guide surface 338c of the associated guide hole 338 to thereby create a component of force that presses the pawl 330 toward the outer peripheral side against the load in the direction D2. This component of force causes a force acting on the pawl 330 to press the outer toothed portion 34 thereof against the internal gear 65 of the ratchet plate 60, which makes it possible to reliably maintain the engagement between the outer toothed portion 34 of each pawl 330 and the internal gear 65 of the ratchet plate 60.

In addition, each pawl 330 can be prevented from tilting or becoming deformed more than that shown in FIG. 25 by engagement of portions of the inner surfaces of the pair of guide holes 337 and 338 of each pawl 330 except the inclined guide surfaces 337c and 338c with the pawl guide projections 326 and 327.

In the case where each pawl 330 can secure a sufficient wall thickness, the engaged portions on each pawl 330 can each be formed into a bottomed hole or a recess, instead of a through-hole such as the guide hole 337 or 338. It is more advantageous to form each engaged portion on each pawl 330 into a bottomed hole or a recess to secure strength of each pawl 330.

Although the present invention has been described based on the above illustrated embodiments of the seat reclining apparatuses, the present invention is not limited solely to these particular embodiments; various modifications to the above illustrated embodiments of the seat reclining apparatuses are possible.

For instance, the meshed-state retainer in each of the above illustrated embodiments is provided with the pawl guide recesses 26 (126, 226), each of which is substantially symmetrical in shape with respect to the associated center line C1 in the circumferential direction, or the three pairs of pawl guide projections 326 and 327, each pair of which are substantially symmetrical in shape with respect to the associated center line C11 in the circumferential direction, as the engaging portions that are provided on the base plate 20 (120, 220, 320). In addition, the meshed-state retainer in each of the above illustrated embodiments is provided with the three pairs of guide projections 37 and 38 (137 and 138, 237 and 238), each pair of which are substantially symmetrical in shape with respect to the associated center line C2 in the circumferential direction, or the three pairs of guide holes 337 and 338, each pair of which are substantially symmetrical in shape with respect to the associated center line C2 in the circumferential direction, as the engaged portions that are provided on the pawls 30 (130, 230, 330). According to each of these embodiments, even when the pawls 30 (130, 230, 330) move in either of the directions D1 and D2 shown in FIG. 13, 17, 21 or 25, a similar component of force can be exerted on each pawl 30 (130, 230, 330) to move this pawl to the engaged position, which is well-balanced. However, in the case where a required load bearing performance (meshing strength) is different between the directions D1 and D2, it is possible to form each pair of engaging portions or each pair of engaged portions asymmetrically in shape with respect to the circumferential direction. Additionally, the meshed-state retainer in each of the above illustrated embodiments can also be constructed to be capable of functioning solely for the movement of each pawl 30 (130, 230, 330) in one of the directions D1 and D2.

In the above illustrated embodiments, the inclined guide surfaces (26*a*, 26*b*, 37*c*, 38*c*, 126*a*, 126*b*, 137*c*, 138*c*, 226*a*, 226*b*, 226*c*, 226*d*, 237*c*, 237*d*, 238*c*, 238*d*, 326*c*, 327*c*, 337*c*, 338*c*), which are inclined surfaces that create a component of force in a direction toward the engaged position (in which the outer toothed portion 34 of each pawl is engaged with the internal gear 65 of the ratchet plate 60) when each pawl 30 (130, 230, 330) moves in the circumferential direction, are formed on both the engaging portions provided on the base plate 20 (120, 220, 320) and the engaged portions provided on the pawls 30 (130, 230, 330), and the inclined guide surfaces on the engaging portions and the inclined guide surfaces on the engaged portions are made to come in contact with each other. This structure can be modified; e.g., it is also possible to form the inclined guide surfaces that create a component of force in a direction toward the engaged position when each pawl moves in the circumferential direction on either one of the engaging portions provided on the base plate 20 (120, 220, 320) or the engaged portions on the pawls 30 (130, 230, 330) and form contact portions (different in shape from the inclined guide surfaces) which come in contact with the inclined guide surfaces on the other.

In the above illustrated embodiments, each restricted portion 35 of each pawl 30 (130, 230, 330) and each restrictor portion 42 of the rotational cam 40 are already in contact with each other before each engaging portion (the pawl guide recesses 26, 126, 226, or the pawl guide projections 326, 327) provided on the base plate 20 (120, 220, 320) and each engaged portion (the guide projections 37, 38, 137, 138, 237, 238, or the guide holes 337, 338) provided on the pawls 30 (130, 230, 330) come in contact with each other. However, the seat reclining structure can be modified so that each restricted portion 35 and each restrictor portion 42 come in contact with each other either after or at the same time each engaging portion and each engaged portion are engaged with each other.

Inversely to the structures of the above illustrated embodiments, the base plate 20 (120, 220, 320) and the ratchet plate 30 can be fixed to a frame on the seatback 12 side and a frame on the seat cushion 11 side, respectively.

Among all the left and right frames provided as elements of the seat cushion 11 and the seatback 12, the seat cushion frame and the seatback frame on the right side facing forward are connected via the seat reclining apparatus 15 (16, 17, 18) in each of the above illustrated embodiments; however, the seat cushion frame and the seatback frame on the left side facing forward can be connected via the seat reclining apparatus 15 (16, 17, 18).

Additionally, it is possible to connect the right rear frame of the seat cushion 11 and the right seatback frame to each other via the seat reclining apparatus (right seat reclining apparatus) 15 (16, 17, 18)), connect the left rear frame of the seat cushion 11 and the left seatback frame to each other via a left seat reclining apparatus bisymmetrically identical to the right seat reclining apparatus 15 (16, 17, 18) and connect the rotational cam 40 of the right seat reclining apparatus 15 (16, 17, 18) and the rotational cam (which corresponds to the rotational cam 40) of the left seat reclining apparatus to each other via a connecting pipe, or the like, so that the left and right seat reclining apparatuses move in synchronization with each other.

Obvious changes may be made in the specific embodiments of the present invention described herein, such modifications being within the spirit and scope of the invention claimed. It is indicated that all matter contained herein is illustrative and does not limit the scope of the present invention.

What is claimed is:

1. A seat reclining apparatus which enables an angle of a seatback of a reclining seat to be adjusted relative to a seat cushion of said reclining seat, said seat reclining apparatus comprising:
    a base member provided on one of said seat cushion and said seatback;
    a ratchet provided on the other of said seat cushion and said seatback and allowed to rotate relative to said base member, said ratchet provided with a meshing portion;
    a lock member configured to be guided by a guide portion formed on said base member so that said lock member is movable between an engaged position, in which said lock member is engaged with said meshing portion of said ratchet, and a disengaged position, in which said lock member is disengaged from said meshing portion of said ratchet;
    a lock driver configured to move said lock member between said engaged position and said disengaged position in accordance with rotation of a rotational shaft member; and
    a meshed-state retainer including an engaging portion provided on said base member independently of said guide portion, and an engaged portion provided on said lock member,
    wherein, when said lock member in said engaged position moves in a direction different from a direction in which said lock member is guided by said guide portion of said base member, said meshed-state retainer is configured to move said lock member toward said engaged position via engagement of said engaged portion with said engaging portion to retain a meshed state between said lock member and said meshing portion of said ratchet.

2. The seat reclining apparatus according to claim 1, wherein said engaging portion of said meshed-state retainer comprises a pair of engaging portions provided at different positions with respect to a circumferential direction about a rotation center of said ratchet, and
    wherein said engaged portion of said meshed-state retainer comprises a pair of engaged portions provided at different positions with respect to said circumferential direction.

3. The seat reclining apparatus according to claim 2, wherein said lock member comprises a restriction portion which comes into contact with a contact portion formed on said ratchet, whereby movement of said lock member toward said engaged position is restricted, when said ratchet is positioned at a predetermined position in said circumferential direction relative to said base member, and
    wherein said pair of engaged portions are positioned on either side of said restriction portion with respect to said circumferential direction.

4. The seat reclining apparatus according to claim 1, wherein said engaging portion comprises a depression formed on said base member, and
    wherein said engaged portion comprises a projection which projects from said lock member to be positioned in said depression.

5. The seat reclining apparatus according to claim 1, wherein said engaged portion comprises a depression formed on said base member, and
   wherein said engaging portion comprises a projection which projects from said lock member to be positioned in said depression.

6. The seat reclining apparatus according to claim 1, wherein said lock driver comprises a rotational member having a through-hole into which said rotational shaft member is inserted to be non-rotatable relative to said rotational member.

\* \* \* \* \*